US012058786B2

(12) United States Patent
Atkins et al.

(10) Patent No.: US 12,058,786 B2
(45) Date of Patent: Aug. 6, 2024

(54) HEATING ELEMENT

(71) Applicant: JUUL Labs, Inc., San Francisco, CA (US)

(72) Inventors: Ariel Atkins, San Francisco, CA (US); Steven Christensen, Burlingame, CA (US); Alexander J. Gould, Portola Valley, CA (US); Bryan White, Pleasanton, CA (US)

(73) Assignee: JUUL LABS, INC., San Francisco, CA (US)

( * ) Notice: Subject to any disclaimer, the term of this patent is extended or adjusted under 35 U.S.C. 154(b) by 891 days.

(21) Appl. No.: 16/596,113

(22) Filed: Oct. 8, 2019

(65) Prior Publication Data

US 2020/0107585 A1 Apr. 9, 2020

Related U.S. Application Data

(60) Provisional application No. 62/742,554, filed on Oct. 8, 2018.

(51) Int. Cl.

| | |
|---|---|
| ***A24F 40/10*** | (2020.01) |
| ***A24F 40/42*** | (2020.01) |
| ***A24F 40/44*** | (2020.01) |
| ***H05B 3/42*** | (2006.01) |
| *A24F 40/46* | (2020.01) |

(52) U.S. Cl.
CPC ............... *H05B 3/42* (2013.01); *A24F 40/10* (2020.01); *A24F 40/42* (2020.01); *A24F 40/44* (2020.01); *A24F 40/46* (2020.01)

(58) Field of Classification Search
CPC .......... A24F 40/10; A24F 40/42; A24F 40/44; H05B 3/42
USPC ........................................................ 131/330
See application file for complete search history.

(56) References Cited

U.S. PATENT DOCUMENTS

| | | | |
|---|---|---|---|
| 5,666,977 | A | 9/1997 | Higgins et al. |
| 6,501,052 | B2 | 12/2002 | Cox et al. |
| 6,854,461 | B2 | 2/2005 | Nichols et al. |
| 7,040,314 | B2 | 5/2006 | Nguyen et al. |
| 7,147,170 | B2 | 12/2006 | Nguyen et al. |
| 7,167,776 | B2 | 1/2007 | Maharajh et al. |

(Continued)

FOREIGN PATENT DOCUMENTS

| | | | |
|---|---|---|---|
| AR | 072355 | A1 | 8/2010 |
| AR | 089589 | A1 | 9/2014 |

(Continued)

OTHER PUBLICATIONS

Merriam-Webster Dictionary, Definition of Rigid, https://www.merriam-webster.com/dictionary/rigid (Year: 2022).*

(Continued)

*Primary Examiner* — Russell E Sparks
(74) *Attorney, Agent, or Firm* — Mintz Levin Cohn Ferris Glovsky and Popeo, P.C.

(57) ABSTRACT

A vaporizer device includes a cartridge having a reservoir that holds a vaporizable material and an atomizer chamber that includes a heating element. The heating element can heat the vaporizable material. The heating element can include two rigid portions that are spaced apart by a span that defines a capillary gap. The capillary gap can draw the vaporizable material from the reservoir to a heater region to be vaporized.

14 Claims, 24 Drawing Sheets

(56) References Cited

U.S. PATENT DOCUMENTS 7,367,334 B2 5/2008 Faison et al.
7,500,479 B2 3/2009 Nichols et al.
8,371,310 B2 * 2/2013 Brenneise ............... A24F 40/46 131/194
8,393,331 B2 3/2013 Hon
8,528,569 B1 9/2013 Newton et al.
8,833,364 B2 9/2014 Buchberger
8,881,737 B2 * 11/2014 Collett .................... A24F 40/46 131/194
8,948,578 B2 2/2015 Buchberger
9,282,772 B2 3/2016 Tucker et al.
9,289,014 B2 3/2016 Tucker et al.
9,308,336 B2 4/2016 Newton
9,420,829 B2 8/2016 Thorens et al.
9,648,908 B1 5/2017 Rinehart et al.
9,681,688 B1 6/2017 Rinehart et al.
9,687,027 B2 6/2017 Poston et al.
9,723,876 B2 8/2017 Cadieux et al.
9,808,034 B2 11/2017 Hon
9,844,234 B2 12/2017 Thorens et al.
9,877,511 B2 1/2018 Li et al.
9,918,496 B2 3/2018 Kane et al.
9,949,507 B2 4/2018 Flick
9,955,726 B2 5/2018 Brinkley et al.
9,974,335 B2 5/2018 Lord
9,980,514 B2 5/2018 Malamud et al.
9,999,250 B2 * 6/2018 Minskoff ................. H05B 3/12
10,010,695 B2 7/2018 Buchberger
10,034,988 B2 7/2018 Wensley et al.
10,070,667 B2 9/2018 Lord et al.
10,098,381 B2 10/2018 Kane et al.
10,104,911 B2 10/2018 Thorens et al.
10,143,239 B2 12/2018 Gavrielov et al.
10,172,387 B2 1/2019 Davis et al.
10,238,145 B2 3/2019 Guenther et al.
10,247,443 B2 4/2019 Flick
10,258,087 B2 4/2019 Kane
10,272,170 B2 4/2019 Dubief
10,278,423 B2 5/2019 Smith et al.
10,278,427 B2 5/2019 Buchberger
10,285,450 B2 5/2019 Gavrielov et al.
10,299,514 B2 5/2019 Bilat et al.
10,314,338 B2 6/2019 Hawes et al.
10,314,340 B2 6/2019 Davis et al.
10,334,880 B2 7/2019 Rogers et al.
10,342,262 B2 * 7/2019 Silvestrini ............... A24F 40/46
10,357,060 B2 7/2019 Rostami et al.
10,375,990 B2 8/2019 Lord
10,398,175 B2 9/2019 Thorens
10,405,579 B2 9/2019 Collett et al.
10,433,581 B2 10/2019 Li et al.
10,463,077 B2 * 11/2019 Lau .......................... H05B 3/44
10,518,243 B2 12/2019 Macko et al.
10,520,089 B2 12/2019 Li et al.
10,555,552 B2 2/2020 Batista et al.
10,555,556 B2 2/2020 Malgat et al.
10,609,961 B2 4/2020 Ampolini et al.
10,660,365 B2 5/2020 Lipowicz et al.
10,660,370 B2 5/2020 Rogers et al.
10,674,764 B2 6/2020 Reevell
10,687,554 B2 6/2020 Hawes et al.
10,729,177 B2 8/2020 Dendy et al.
10,750,784 B2 8/2020 Mironov et al.
10,757,976 B2 9/2020 Mironov et al.
10,772,356 B2 9/2020 Tucker et al.
10,786,008 B2 9/2020 Borkovec et al.
10,792,442 B2 10/2020 Price et al.
10,828,385 B2 11/2020 Yang et al.
10,842,193 B2 11/2020 Sahin et al.
10,849,358 B2 12/2020 Mishra et al.
10,874,142 B2 12/2020 Mironov et al.
10,881,139 B2 1/2021 Li et al.
10,897,930 B2 1/2021 Weigensberg et al.
10,905,159 B2 2/2021 Janardhan et al.
10,905,160 B2 2/2021 Tong
10,925,315 B2 2/2021 Bilat
10,945,461 B2 3/2021 Juster et al.
10,994,086 B2 5/2021 Garthaffner et al.
11,006,669 B2 5/2021 Reevell
11,035,704 B2 6/2021 Kane et al.
11,090,450 B2 8/2021 Li et al.
11,129,414 B2 9/2021 Atkins et al.
11,160,936 B2 11/2021 Bache et al.
11,160,939 B2 11/2021 Sears et al.
11,206,868 B2 12/2021 Alarcon et al.
11,241,039 B2 2/2022 Force et al.
11,278,687 B2 3/2022 Sudlow et al.
11,290,182 B2 3/2022 Bache et al.
11,291,783 B2 4/2022 Fraser et al.
11,297,876 B2 4/2022 Brinkley et al.
11,298,479 B2 4/2022 Fraser et al.
11,660,403 B2 5/2023 Atkins et al.
2006/0047368 A1 3/2006 Maharajh et al.
2006/0093977 A1 5/2006 Pellizzari et al.
2009/0255534 A1 10/2009 Paterno
2014/0190496 A1 7/2014 Wensley et al.
2014/0261493 A1 9/2014 Smith et al.
2015/0020822 A1 1/2015 Janardhan et al.
2015/0027468 A1 1/2015 Li et al.
2015/0027469 A1 1/2015 Tucker et al.
2015/0216237 A1 8/2015 Wensley et al.
2015/0217068 A1 8/2015 Wakalopulos
2015/0257447 A1 9/2015 Sullivan
2015/0335070 A1 11/2015 Sears et al.
2015/0335074 A1 11/2015 Leung
2015/0359261 A1 12/2015 Li et al.
2016/0021930 A1 * 1/2016 Minskoff ................ A24F 40/51 392/395
2016/0174611 A1 6/2016 Monsees et al.
2016/0183596 A1 6/2016 Rado
2016/0192708 A1 7/2016 Demeritt et al.
2016/0366725 A1 12/2016 Tucker et al.
2017/0035112 A1 2/2017 Thorens
2017/0035113 A1 2/2017 Thorens
2017/0042245 A1 2/2017 Buchberger et al.
2017/0071253 A1 3/2017 Revell
2017/0086501 A1 3/2017 Buehler et al.
2017/0188629 A1 7/2017 Dickens et al.
2017/0231277 A1 8/2017 Mironov et al.
2017/0231278 A1 8/2017 Mironov et al.
2017/0251722 A1 9/2017 Kobal et al.
2017/0258138 A1 9/2017 Rostami et al.
2017/0258140 A1 9/2017 Rostami et al.
2017/0265524 A1 9/2017 Cadieux et al.
2017/0273354 A1 9/2017 Tucker et al.
2017/0280769 A1 10/2017 Li et al.
2017/0280771 A1 10/2017 Courbat et al.
2017/0340011 A1 11/2017 Batista et al.
2017/0340014 A1 11/2017 Batista et al.
2017/0347401 A1 * 11/2017 Mironov .................. H05B 3/36
2018/0007966 A1 1/2018 Li
2018/0020729 A1 1/2018 Alarcon et al.
2018/0020736 A1 1/2018 Silvestrini et al.
2018/0027877 A1 2/2018 Tucker et al.
2018/0064169 A1 3/2018 Biel et al.
2018/0066645 A1 3/2018 Mazur
2018/0070641 A1 3/2018 Batista et al.
2018/0077967 A1 3/2018 Hatton et al.
2018/0177240 A1 6/2018 Duque et al.
2018/0184712 A1 7/2018 Fraser et al.
2018/0242642 A1 8/2018 Silvesstrini et al.
2018/0271140 A1 9/2018 Kobal et al.
2018/0360116 A1 12/2018 Schmidt et al.
2019/0104764 A1 4/2019 Tucker et al.
2019/0124982 A1 5/2019 Atkins et al.
2019/0200674 A1 7/2019 Tucker et al.
2019/0223508 A1 7/2019 Otiaba et al.
2020/0000151 A1 1/2020 Fraser et al.
2020/0022416 A1 1/2020 Alarcon
2020/0068949 A1 3/2020 Rasmussen
2020/0352238 A1 11/2020 Simpson et al.

(56) References Cited

U.S. PATENT DOCUMENTS

| | | | |
|---|---|---|---|
| 2021/0186104 | A1 | 6/2021 | Mironov et al. |
| 2021/0204609 | A1 | 7/2021 | Bilat et al. |

FOREIGN PATENT DOCUMENTS

| | | | | | |
|---|---|---|---|---|---|
| CA | 3048627 | A1 | | 7/2018 | |
| CN | 101228969 | A | | 7/2008 | |
| CN | 204180941 | U | | 3/2015 | |
| CN | 104684422 | A | | 6/2015 | |
| CN | 105188428 | B | | 12/2015 | |
| CN | 105916399 | A | | 8/2016 | |
| CN | 207011686 | U | | 2/2018 | |
| CN | 108289510 | B | | 7/2018 | |
| CN | 108514158 | A | * | 9/2018 | ........... A24F 47/008 |
| EP | 0893071 | A1 | | 1/1999 | |
| EP | 1428080 | B1 | | 6/2004 | |
| EP | 1428413 | B1 | | 6/2004 | |
| EP | 1471955 | B1 | | 11/2004 | |
| EP | 1626746 | B1 | | 2/2006 | |
| EP | 2083894 | B1 | | 8/2009 | |
| EP | 2214758 | B1 | | 8/2010 | |
| EP | 2488218 | B1 | | 8/2012 | |
| EP | 2719416 | B1 | | 4/2014 | |
| EP | 3099190 | B1 | | 12/2016 | |
| EP | 3104721 | B1 | | 12/2016 | |
| EP | 3162228 | B1 | | 5/2017 | |
| EP | 3228198 | A1 | | 10/2017 | |
| EP | 3232842 | B1 | | 10/2017 | |
| EP | 3272236 | B1 | | 1/2018 | |
| EP | 3319464 | B1 | | 5/2018 | |
| EP | 3379955 | B1 | | 10/2018 | |
| EP | 3383460 | B1 | | 10/2018 | |
| EP | 3383461 | B1 | | 10/2018 | |
| EP | 3419445 | B1 | | 1/2019 | |
| EP | 3435794 | B1 | | 2/2019 | |
| EP | 3436117 | B1 | | 2/2019 | |
| EP | 3481473 | B1 | | 5/2019 | |
| EP | 3487325 | B1 | | 5/2019 | |
| EP | 3494811 | B1 | | 6/2019 | |
| EP | 3498051 | B1 | | 6/2019 | |
| EP | 3508080 | B1 | | 7/2019 | |
| EP | 3531849 | B1 | | 9/2019 | |
| EP | 3536178 | B1 | | 9/2019 | |
| EP | 3562336 | B1 | | 11/2019 | |
| EP | 3585189 | B1 | | 1/2020 | |
| EP | 3585190 | B1 | | 1/2020 | |
| EP | 3694353 | B1 | | 8/2020 | |
| EP | 3701812 | B1 | | 9/2020 | |
| EP | 3701813 | B1 | | 9/2020 | |
| EP | 3701815 | B1 | | 9/2020 | |
| EP | 3731665 | B1 | | 11/2020 | |
| EP | 3787423 | B1 | | 3/2021 | |
| EP | 3801084 | B1 | | 4/2021 | |
| EP | 3811801 | B1 | | 4/2021 | |
| EP | 3811802 | B1 | | 4/2021 | |
| EP | 3855948 | B1 | | 8/2021 | |
| EP | 3855961 | B1 | | 8/2021 | |
| EP | 3855964 | B1 | | 8/2021 | |
| JP | 2015500025 | A | | 1/2015 | |
| KR | 20090023742 | A | | 3/2009 | |
| KR | 20120132004 | A | | 12/2012 | |
| KR | 20120132070 | A | | 12/2012 | |
| KR | 20130116887 | A | | 10/2013 | |
| KR | 20180058711 | A | | 6/2018 | |
| KR | 20180094868 | A | | 8/2018 | |
| KR | 20180127375 | A | | 11/2018 | |
| RU | 115629 | U1 | | 5/2012 | |
| WO | WO-2008077271 | A1 | | 7/2008 | |
| WO | WO-2009132793 | A1 | | 11/2009 | |
| WO | WO-2013083635 | A1 | | 6/2013 | |
| WO | WO-2013083638 | A1 | | 6/2013 | |
| WO | WO-2015167629 | A1 | | 11/2015 | |
| WO | WO-2016092261 | A1 | * | 6/2016 | ............. A24F 40/10 |
| WO | WO-2016108694 | A1 | | 7/2016 | |
| WO | WO-2017028295 | A1 | * | 2/2017 | ............. A24F 40/44 |
| WO | WO-2017082728 | A1 | | 5/2017 | |
| WO | WO-2017084848 | A1 | | 5/2017 | |
| WO | WO-2017207415 | A1 | | 12/2017 | |
| WO | WO-2017207416 | A1 | | 12/2017 | |
| WO | WO-2017207419 | A1 | | 12/2017 | |
| WO | WO-2018007633 | A1 | | 1/2018 | |
| WO | WO-2018172765 | A1 | | 9/2018 | |
| WO | WO-2018211035 | A1 | | 11/2018 | |
| WO | WO-2020025644 | A1 | | 2/2020 | |

OTHER PUBLICATIONS

Merriam-Webster Dictionary, Definition of Fold, https://www.merriam-webster.com/dictionary/fold (Year: 2022).*

Machine Translation of CN 108514158 (Year: 2023).*

* cited by examiner

HEATING ELEMENT

CROSS-REFERENCE TO RELATED APPLICATIONS

This application claims priority to U.S. Provisional Application No. 62/742,554, titled "HEATING ELEMENT" and filed on Oct. 8, 2018, the entirety of which is incorporated by reference herein.

TECHNICAL FIELD

The subject matter described herein relates to vaporizer devices, including heating elements for vaporizer devices.

BACKGROUND

Vaporizing devices, which can also be referred to as vaporizers, electronic vaporizer devices, or e-vaporizer devices, can be used for delivery of an aerosol (e.g., vapor-phase and/or condensed-phase material suspended in a stationary or moving mass of air or some other gas carrier) containing one or more active ingredients by inhalation of the aerosol by a user of the vaporizing device. For example, electronic nicotine delivery systems (ENDS) include a class of vaporizer devices that are battery powered and that may be used to simulate the experience of smoking, but without burning of tobacco or other substances. Vaporizers are gaining increasing popularity both for prescriptive medical use, in delivering medicaments, and for consumption of tobacco, nicotine, and other plant-based vaporizable materials, including solid and/or liquid materials, and prefilled pods (cartridges, wrapped containers, etc.) of such materials. Vaporizer devices may be portable, self-contained, and convenient for use.

In use of a vaporizer device, the user inhales an aerosol, colloquially referred to as "vapor," which may be generated by a heating element that vaporizes (e.g., causes a liquid or solid to at least partially transition to the gas phase) a vaporizable material, which may be liquid, a solution, a solid, a paste, a wax, and/or any other form compatible for use with a specific vaporizer device. The vaporizable material used with a vaporizer can be provided within a cartridge (e.g., a separable part of the vaporizer device that contains vaporizable material) that includes an outlet (e.g., a mouthpiece) for inhalation of the aerosol by a user.

To receive the inhalable aerosol generated by a vaporizer device, a user may, in certain examples, activate the vaporizer device by taking a puff, by pressing a button, and/or by some other approach. A puff as used herein can refer to inhalation by the user in a manner that causes a volume of air to be drawn into the vaporizer device such that the inhalable aerosol is generated by a combination of vaporized vaporizable material with the volume of air.

An approach by which a vaporizer device generates an inhalable aerosol from a vaporizable material involves heating the vaporizable material in a vaporization chamber (e.g., a heater chamber) to cause the vaporizable material to be converted to the gas (or vapor) phase. A vaporization chamber can refer to an area or volume in the vaporizer device within which a heat source (e.g., conductive, convective, and/or radiative) causes heating of a vaporizable material to produce a mixture of air and vaporized material to form a vapor for inhalation of the vaporizable material by a user of the vaporizer device.

In some implementations, the vaporizable material can be drawn out of a reservoir and into the vaporization chamber via a wicking element (e.g., a wick). Drawing of the vaporizable material into the vaporization chamber may be at least partially due to capillary action provided by the wick as the wick pulls the vaporizable material along the wick in the direction of the vaporization chamber.

Vaporizer devices can be controlled by one or more controllers, electronic circuits (e.g., sensors, heating elements), and/or the like on the vaporizer. Vaporizer devices may also wirelessly communicate with an external controller (e.g., a computing device such as a smartphone).

SUMMARY

Aspects of the current subject matter relate to a heating element for use in a vaporizer device.

According to some implementations, a cartridge for a vaporizer device includes a reservoir and a heating element. The reservoir may hold a vaporizable material. The heating element may heat the vaporizable material. The heating element may include a capillary structure, which includes a plurality of rigid portions. Pairs of the plurality of rigid portions may be spaced apart from one another to define a capillary gap therebetween. The capillary gap may draw the vaporizable material from the reservoir to a heater region of the heating element to be heated. An aerosol may be generated by heating the vaporizable material drawn to the heater region of the heating element.

In some implementations, the plurality of rigid portions of the capillary structure includes an upper rigid portion and a lower rigid portion integrally formed with the upper rigid portion and spaced apart from the upper rigid portion by a span that defines the capillary gap.

In some implementations, the plurality of rigid portions of the capillary structure includes an upper end portion in fluid communication with the reservoir, a lower end portion including a heater, a lower rigid portion, and an upper rigid portion integrally formed with the lower rigid portion. The upper rigid portion may include a plurality of upwardly extending members. The capillary gap may be formed between adjacent upwardly extending members of the plurality of upwardly extending members.

In some implementations, the plurality of rigid portions of the capillary structure includes an inner rigid portion defining a channel and an outer rigid portion surrounding the inner rigid portion and spaced apart from the inner rigid portion by a span that defines the capillary gap.

In some implementations, the heating element is at least partially positioned within the reservoir.

In some implementations, an upper rigid portion of the plurality of rigid portions may include an upper vaporization portion having a plurality of upper gaps and a lower rigid portion of the plurality of rigid portions. The lower rigid portion may include a lower vaporization portion having a plurality of lower gaps. The plurality of upper gaps may be positioned laterally offset from the plurality of lower gaps.

In some implementations, the cartridge may include an air inlet. The air inlet may direct a flow of air across the heater region such that when the heating element is activated, the vaporizable material drawn into the capillary gap at the heater region is evaporated into the flow of air.

In some implementations, the heating element includes an electrically conductive layer. The electrically conductive layer may include a trace pattern.

In some implementations, the heating element comprises nichrome.

In some implementations, the cartridge includes an atomizer chamber housing that surrounds at least a portion of the heating element. The atomizer chamber housing may include a cutout region. The cutout region may receive a porous material configured to absorb the vaporizable material.

In some implementations, the heating element forms a single rigid portion that is folded to define the upper rigid portion and the lower rigid portion. In some implementations, the upper rigid portion is positioned parallel to the lower rigid portion.

In some implementations, the heating element includes a plurality of perforations to allow the vaporizable material to evaporate therethrough.

According to some implementations, a method includes drawing, through a capillary gap formed between two rigid portions of a heating element, a vaporizable material from a reservoir of a vaporizer device to a heater region. The heating element may be partially positioned within at least a portion of the reservoir. Each of the two rigid portions may have a vaporization portion. The method may also include heating at least the vaporization portion of the two rigid portions to cause vaporization of the vaporizable material. The method may further include causing the vaporized vaporizable material to be entrained in a flow of air along an air flow path to a mouthpiece of the vaporizer device.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Implementations of the current subject matter include methods, apparatuses, articles of manufacture, and systems relating to vaporization of one or more materials for inhalation by a user. Example implementations include vaporizer devices and systems including vaporizer devices. The term "vaporizer device" as used in the following description and claims refers to any of a self-contained apparatus, an apparatus that includes two or more separable parts (e.g., a vaporizer body that includes a battery and other hardware, and a cartridge that includes a vaporizable material), and/or the like. A "vaporizer system," as used herein, may include one or more components, such as a vaporizer device. Examples of vaporizer devices consistent with implementations of the current subject matter include electronic vaporizers, electronic nicotine delivery systems (ENDS), and/or the like. In general, such vaporizer devices are hand-held devices that heat (e.g., by convection, conduction, radiation, and/or some combination thereof) a vaporizable material to provide an inhalable dose of the material. The vaporizable material used with a vaporizer device may be provided within a cartridge (e.g., a part of the vaporizer that contains the vaporizable material in a reservoir or other container) which may be refillable when empty, or disposable such that a new cartridge containing additional vaporizable material of a same or different type can be used). A vaporizer device may be a cartridge-using vaporizer device, a cartridge-less vaporizer device, or a multi-use vaporizer device capable of use with or without a cartridge. For example, a vaporizer device may include a heating chamber (e.g., an oven or other region in which material is heated by a heating element) configured to receive a vaporizable material directly into the heating chamber, and/or a reservoir or the like for containing the vaporizable material. In some implementations, a vaporizer device may be configured for use with a liquid vaporizable material (e.g., a carrier solution in which an active and/or inactive ingredient(s) are suspended or held in solution, or a liquid form of the vaporizable material itself), a paste, a wax, and/or a solid vaporizable material. A solid vaporizable material may include a plant material that emits some part of the plant material as the vaporizable material (e.g., such that some part of the plant material remains as waste after the material is vaporized for inhalation by a user) or optionally can be a solid form of the vaporizable material itself, such that all of the solid material may eventually be vaporized for inhalation. A liquid vaporizable material may likewise be capable of being completely vaporized, or may include some portion of the liquid material that remains after all of the material suitable for inhalation has been vaporized.

Figure 1A:
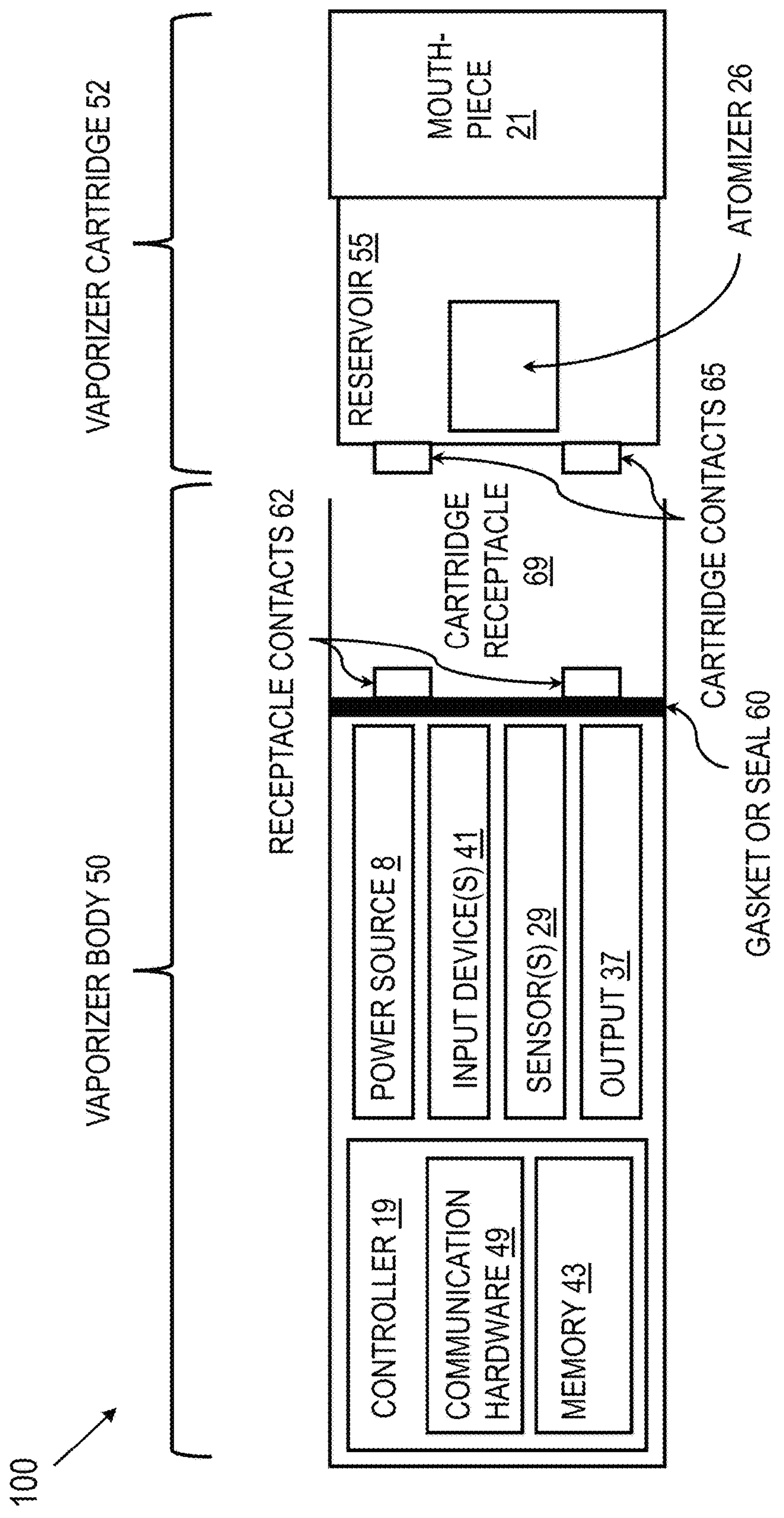
FIG. 1A shows a block diagram illustrating features of a cartridge-based vaporizer consistent with implementations of the current subject matter.

Referring to the block diagram of FIG. 1A, a vaporizer device 100 can include a power source 8 (e.g., a battery, which may be a rechargeable battery), and a controller 19 (e.g., a processor, circuitry, etc. capable of executing logic) for controlling delivery of heat to an atomizer 26 to cause a vaporizable material to be converted from a condensed form (e.g., a solid, a liquid, a solution, a suspension, a part of an at least partially unprocessed plant material, etc.) to the gas phase. The controller 19 may be part of one or more printed circuit boards (PCBs) consistent with certain implementations of the current subject matter. After conversion of the vaporizable material to the gas phase, and depending on the type of vaporizer, the physical and chemical properties of the vaporizable material, and/or other factors, at least some of the gas-phase vaporizable material may condense to form particulate matter in at least a partial local equilibrium with the gas phase as part of an aerosol, which can form some or all of an inhalable dose provided by the vaporizer device 100 during a user's puff or draw on the vaporizer device 100. It should be appreciated that the interplay between gas and condensed phases in an aerosol generated by a vaporizer device 100 can be complex and dynamic, due to factors such as ambient temperature, relative humidity, chemistry, flow conditions in airflow paths (both inside the vaporizer device 100 and in the airways of a human or other animal), and/or mixing of the gas-phase or aerosol-phase vaporizable material with other air streams, etc., which may affect one or more physical parameters of an aerosol. In some vaporizer devices, and particularly for vaporizer devices configured for delivery of volatile vaporizable materials, the inhalable dose may exist predominantly in the gas phase (e.g., formation of condensed phase particles may be very limited).

Aspects of the current subject matter may include use of atomizer elements with a structure that need not be porous, but instead may include a narrow, wettable gap between structural elements such that capillary pressure draws liquid vaporizable material from a reservoir to a heated zone of the heating element for vaporization. Such structures may provide advantages relating to more easily controllable capillary pressures, ease of manufacturing, and the like.

Vaporizer devices 100 for use with liquid vaporizable materials (e.g., neat liquids, suspensions, solutions, mixtures, etc.) can include an atomizer 26 in which a wicking element (e.g., a wick (not shown in FIG. 2), which can include any material capable of causing fluid motion by capillary pressure) conveys an amount of a liquid vaporizable material to a part of the atomizer that includes a heating element (also not shown in FIG. 2). The wicking element is generally configured to draw liquid vaporizable material from a reservoir configured to contain (and that may in use contain) the liquid vaporizable material, such that the liquid vaporizable material may be vaporized by heat delivered from a heating element. The wicking element may also optionally allow air to enter the reservoir and replace the volume of liquid removed. In some implementations of the current subject matter, capillary action may pull liquid vaporizable material into the wick for vaporization by the heating element, and air may return to the reservoir 140 through the wick to at least partially equalize pressure in the reservoir.

Other methods of allowing air back into the reservoir 140 to equalize pressure are also within the scope of the current subject matter. For example, vaporizer devices have utilized a wick formed of silica, cotton, or fiberglass material. A silica wick material may be formed by bundling together fine, continuous filaments of, for example, silica glass, first into threads, which are then bundled together to form the cord or rope used as the wick. The cord may be specified by a nominal outer diameter, number of threads, and/or a value indicating a linear density.

As used herein, the terms "wick" or "wicking element" include any material capable of causing fluid motion via capillary pressure.

Heating elements can be or include one or more of a conductive heater, a radiative heater, and a convective heater. One type of heating element is a resistive heating element, may comprise a material (e.g., a metal or alloy, for example a nickel-chromium alloy, or a non-metallic resistor) configured to dissipate electrical power in the form of heat when electrical current is passed through one or more resistive segments of the heating element. In some implementations of the current subject matter, an atomizer can include a heating element which includes a resistive coil or other heating element wrapped around, positioned within, integrated into a bulk shape of, pressed into thermal contact with, or otherwise arranged to deliver heat to a wicking element to cause a liquid vaporizable material drawn from a reservoir by the wicking element to be vaporized for subsequent inhalation by a user in a gas and/or a condensed (e.g., aerosol particles or droplets) phase. Other wicking elements, heating elements and/or atomizer assembly configurations are also possible.

However, atomizer systems, in which liquid is drawn into a fibrous wick from a reservoir, may be limited in that the liquid may be predominantly drawn in at or near end points of the cord that are in contact with the liquid in the reservoir (e.g., at end points of continuous filaments of silica or other fibrous material is used as a wick) and then transported along the main axis of the wick to a heated region of the wick form which vaporization occurs. During use of a vaporizer device, liquid may not be replenished to the heated region as quickly as desired for a user as the liquid is vaporized from the heated region of the wick and more liquid needs to travel along the length of the wick for replenishment. Improvements on the liquid delivery rate of such designs may be desirable. Additionally, certain materials used in wick construction, such as fiberglass can easily break and generate dust, which may be undesirable and/or harmful.

In one example of a wick-based atomizer design, a typical wick can have a diameter of approximately 1.5 mm and a surface area of about 4.7 $mm^2$ per mm of length. Increasing the length of the heated section can increase the heating area, but any vaporizable liquid would be required to travel further to reach the center of the heater. Such configurations can limit the total power that can be used for vaporization without also increasing the power density. This can increase the risk that incremental increases in power leads to loss of liquid, rather than more efficient vaporization.

Additional improvements may be possible relative to a traditional atomizer system in which liquid is drawn into the wick from a reservoir. For example, a traditional atomizer system may be fairly complex with many components, and there may be significant variability in the manufacturing and use of the wick and the coil components. Moreover, the wick, formed as described above by bundling together fine, continuous filaments first into threads, which are then bundled together to form the cord or rope used as the wick, may be fragile and its non-rigid structure may require precise and careful placement, increasing the complexity of manufacturing. Certain material properties (such as capillarity) of traditional wicks may be difficult to accurately measure without exposing the material to liquid. Certain material properties may be able to be estimated, but are difficult to predict due to the high compressibility of the materials.

In other atomizer designs, the traditional wick and coil design is modified to incorporate a cylindrical ceramic wick, which addresses some design challenges of having a non-rigid wick as well as shortcomings due to the longitudinal draw of liquid. However, such designs tend to have many parts, also leading to manufacturing complexity, and may have other drawbacks.

In yet another atomizer design, a chimney coil design is implemented. Such a design utilizes a ceramic wick formed into a hollow tube with a heating coil on an inside portion of the hollow tube. Rather than pulling liquid from a reservoir along an axis of the wick, liquid surrounds the perimeter of the chimney coil, resulting in a large wicking area and a short wicking distance. However, this design tends to have a large number of parts, leading to manufacturing complexities.

Each of the atomizers described above may include additional challenges in that the designs may not always be volumetrically compact, and instead may occupy a significant portion of the vaporizer device in which they are incorporated. Reduction of atomizer volume and thereby allowing greater volume for the vaporizable material, can be a key goal of vaporizer design.

Certain vaporizer devices may, additionally, or alternatively be configured to create an inhalable dose of gas-phase and/or aerosol-phase vaporizable material via heating of a non-liquid vaporizable material, such as for example a solid-phase vaporizable material (e.g., a wax or the like) or plant material (e.g., tobacco leaves and/or parts of tobacco leaves). In such vaporizer devices, a resistive heating element may be part of or otherwise incorporated into or in thermal contact with the walls of an oven or other heating chamber into which the non-liquid vaporizable material is placed. Alternatively, a resistive heating element or elements may be used to heat air passing through or past the non-liquid vaporizable material to cause convective heating of the non-liquid vaporizable material. In still other examples, a resistive heating element or elements may be disposed in intimate contact with plant material such that direct conductive heating of the plant material occurs from within a mass of the plant material (e.g., as opposed to only by conduction inward from walls of an oven).

The heating element may be activated (e.g., a controller, which is optionally part of a vaporizer body as discussed below, may cause current to pass from the power source through a circuit including the resistive heating element, which is optionally part of a vaporizer cartridge as discussed below), in association with a user puffing (e.g., drawing, inhaling, etc.) on a mouthpiece 21 of the vaporizer to cause air to flow from an air inlet, along an airflow path that passes an atomizer (e.g., wicking element and heating element). Optionally, air may flow from an air inlet through one or more condensation areas or chambers, to an air outlet in the mouthpiece. Incoming air passing along the airflow path passes over, through, etc., the atomizer, where gas phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in a mouthpiece 21 for inhalation by a user).

Activation of the heating element may be caused by automatic detection of the puff based on one or more of signals generated by one or more sensors 29. These sensors 29 may include one or more of: a pressure sensor or sensors disposed to detect pressure along the airflow path relative to ambient pressure (or optionally to measure changes in absolute pressure), one or more motion sensors (e.g., accelerometers) of the vaporizer device 100, one or more flow sensors of the vaporizer device 100, and/or a capacitive lip sensor of the vaporizer; in response to detection of interaction of a user with one or more input devices 41 (e.g., buttons or other tactile control devices of the vaporizer device 100), receipt of signals from a computing device in communication with the vaporizer device 100; and/or via other approaches for determining that a puff is occurring or imminent.

As discussed herein, a vaporizer device 100 consistent with implementations of the current subject matter may be configured to connect (e.g., wirelessly or via a wired connection) to a computing device (or optionally two or more devices) in communication with the vaporizer device 100. To this end, the controller 19 may include communication hardware 49. The controller may also include a memory 41. The communication hardware 49 can include firmware and/or can be controlled by software for executing one or more cryptographic protocols for the communication.

A computing device can be a component of a vaporizer system that also includes the vaporizer 100, and can include its own hardware for communication, which can establish a wireless communication channel with the communication hardware 49 of the vaporizer device 100. For example, a computing device used as part of a vaporizer system may include a general purpose computing device (e.g., a smartphone, a tablet, a personal computer, some other portable device such as a smartwatch, or the like) that executes software to produce a user interface for enabling a user to interact with a vaporizer device. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. The vaporizer device 100 can also include one or more outputs 37 or devices for providing information to the user. For example, the outputs 37 can include one or more light emitting diodes (LEDs) configured to provide feedback to a user based on a status and/or mode of operation of the vaporizer device 100.

A computing device that is part of a vaporizer system as defined above can be used for any of one or more functions, such as controlling dosing (e.g., dose monitoring, dose setting, dose limiting, user tracking, etc.), controlling sessioning (e.g., session monitoring, session setting, session limiting, user tracking, etc.), controlling nicotine delivery (e.g., switching between nicotine and non-nicotine vaporizable material, adjusting an amount of nicotine delivered, etc.), obtaining locational information (e.g., location of other users, retailer/commercial venue locations, vaping locations, relative or absolute location of the vaporizer itself, etc.), vaporizer personalization (e.g., naming the vaporizer, locking/password protecting the vaporizer, adjusting one or more parental controls, associating the vaporizer with a user group, registering the vaporizer with a manufacturer or warranty maintenance organization, etc.), engaging in social activities with other users (e.g., games, social media communications, interacting with one or more groups, etc.), or the like. The terms "sessioning", "session", "vaporizer session," or "vapor session," are used generically to refer to a period devoted to the use of the vaporizer. The period can include a time period, a number of doses, an amount of vaporizable material, and/or the like.

In the example in which a computing device provides signals related to activation of the resistive heating element, or in other examples of coupling of a computing device with a vaporizer device for implementation of various control or other functions, the computing device executes one or more computer instructions sets to provide a user interface and underlying data handling. In one example, detection by the computing device of user interaction with one or more user interface elements can cause the computing device to signal the vaporizer device 100 to activate the heating element, either to a full operating temperature for creation of an inhalable dose of vapor/aerosol or to a lower temperature to begin heating the heating element. Other functions of the vaporizer device may be controlled by interaction of a user with a user interface on a computing device in communication with the vaporizer device.

The temperature of a resistive heating element of a vaporizer device may depend on a number of factors, including an amount of electrical power delivered to the resistive heating element and/or a duty cycle at which the electrical power is delivered, conductive heat transfer to other parts of the electronic vaporizer device and/or to the environment, latent heat losses due to vaporization of a vaporizable material from the wicking element and/or the atomizer as a whole, and convective heat losses due to airflow (e.g., air moving across the heating element or the atomizer as a whole when a user inhales on the vaporizer device). As noted herein, to reliably activate the heating element or heat the heating element to a desired temperature, a vaporizer device may, in some implementations of the current subject matter, make use of signals from a sensor (e.g., a pressure sensor) to determine when a user is inhaling. The sensor can be positioned in the airflow path and/or can be connected (e.g., by a passageway or other path) to an airflow path containing an inlet for air to enter the device and an outlet via which the user inhales the resulting vapor and/or aerosol such that the sensor experiences changes (e.g., pressure changes) concurrently with air passing through the vaporizer device from the air inlet to the air outlet. In some implementations of the current subject matter, the heating element may be activated in association with a user's puff, for example by automatic detection of the puff by the pressure sensor detecting a change (e.g., a pressure change) in the airflow path.

The sensor(s) 29 can be positioned on or coupled to (e.g., electrically or electronically connected, either physically or via a wireless connection) the controller 19 (e.g., a printed circuit board assembly or other type of circuit board). To take measurements accurately and maintain durability of the vaporizer device 100, it can be beneficial to provide a resilient seal 60 to separate an airflow path from other parts of the vaporizer device 100. The seal 60, which can be a gasket, may be configured to at least partially surround the sensor(s) 29 such that connections of the sensor(s) 29 to the internal circuitry of the vaporizer device 100 are separated from a part of the sensor(s) 29 exposed to the airflow path. In an example of a cartridge-based vaporizer, the seal 60 may also separate parts of one or more electrical connections between a vaporizer body 50 and a vaporizer cartridge 52. Such arrangements of a seal 60 in a vaporizer device 100 can be helpful in mitigating against potentially disruptive impacts on vaporizer components resulting from interactions with environmental factors such as water in the vapor or liquid phases, other fluids such as the vaporizable material, etc. and/or to reduce escape of air from the designated airflow path in the vaporizer device 100. Unwanted air, liquid or other fluid passing and/or contacting circuitry of the vaporizer device 100 can cause various unwanted effects, such as altered pressure readings, and/or can result in the buildup of unwanted material, such as moisture, excess vaporizable material, etc. in parts of the vaporizer where they may result in poor pressure signal, degradation of the sensor(s) or other components, and/or a shorter life of the vaporizer device 100. Leaks in the seal 60 can also result in a user inhaling air that has passed over parts of the vaporizer device 100 containing or constructed of materials that may not be desirable to be inhaled.

In some implementations, a vaporizer body 50 includes a controller 19, a power source 8 (e.g., battery), one or more sensors, charging contacts (e.g., for charging the power source 8), a gasket or sealing mechanism (or seal) 60, and a cartridge receptacle 69 configured to receive a vaporizer cartridge 52 for coupling with the vaporizer body 50 through one or more of a variety of attachment structures. In some examples, vaporizer cartridge 52 includes a reservoir 55 for containing a liquid vaporizable material and a mouthpiece 21 having an aerosol outlet for delivering an inhalable dose to a user. The vaporizer cartridge can include an atomizer 26 having a wicking element and a heating element, or alternatively, one or both of the wicking element and the heating element can be part of the vaporizer body 50. In implementations in which any part of the atomizer 26 (e.g., heating element and/or wicking element) is part of the vaporizer body 50, the vaporizer device can be configured to supply liquid vaporizable material from a reservoir in the vaporizer cartridge to the atomizer part(s) included in the vaporizer body.

Cartridge-based configurations for vaporizers that generate an inhalable dose of a non-liquid vaporizable material via heating of a non-liquid vaporizable material are also within the scope of the current subject matter. For example, a vaporizer cartridge may include a mass of a plant material that is processed and formed to have direct contact with parts of one or more resistive heating elements, and such a vaporizer cartridge may be configured to be coupled mechanically and electrically to a vaporizer body that includes a controller, a power source, and receptacle contacts for connecting to corresponding cartridge contacts and completing a circuit with the one or more resistive heating elements.

In vaporizer devices in which the power source 8 is part of a vaporizer body 50 and a heating element is disposed in a vaporizer cartridge 52 configured to couple with the vaporizer body 50, the vaporizer 100 may include electrical connection features (e.g., means for completing a circuit) for completing a circuit that includes the controller (e.g., a printed circuit board, a microcontroller, or the like), the power source, and the heating element. These features may include at least two contacts (referred to herein as cartridge contacts 65) on a bottom surface of the vaporizer cartridge 52 and at least two contacts (referred to herein as receptacle contacts 62) disposed near a base of the cartridge receptacle of the vaporizer device 100 such that the cartridge contacts 65 and the receptacle contacts 62 make electrical connections when the vaporizer cartridge 52 is inserted into and coupled with the cartridge receptacle 69. The circuit completed by these electrical connections can allow delivery of electrical current to a heating element and may further be used for additional functions, such as measuring a resistance of the heating element for use in determining and/or controlling a temperature of the heating element based on a thermal coefficient of resistivity of the heating element, for identifying a cartridge based on one or more electrical characteristics of a resistive heating element or the other circuitry of the vaporizer cartridge, etc.

In some implementations of the current subject matter, the at least two cartridge contacts and the at least two receptacle contacts can be configured to electrically connect in either of at least two orientations. In other words, one or more circuits necessary for operation of the vaporizer can be completed by insertion of a vaporizer cartridge 52 in the cartridge receptacle 69 in a first rotational orientation (around an axis along which the vaporizer cartridge 52 is inserted into the cartridge receptacle 69 of the vaporizer body 50) such that a first cartridge contact of the at least two cartridge contacts 65 is electrically connected to a first receptacle contact of the at least two receptacle contacts 62 and a second cartridge contact of the at least two cartridge contacts 65 is electrically connected to a second receptacle contact of the at least two receptacle contacts 62. Furthermore, the one or more circuits necessary for operation of the vaporizer can be completed by insertion of a vaporizer cartridge 52 in the cartridge receptacle 69 in a second rotational orientation such that the first cartridge contact of the at least two cartridge contacts 65 is electrically connected to the second receptacle contact of the at least two receptacle contacts 62 and the second cartridge contact of the at least two cartridge contacts 65 is electrically connected to the first receptacle contact of the at least two receptacle contacts 62.

In one example of an attachment structure for coupling a vaporizer cartridge 52 to a vaporizer body, the vaporizer body 50 includes a one or more detects (e.g., dimples, protrusions, etc.) protruding inwardly from an inner surface of the cartridge receptacle 69, additional material (e.g., metal, plastic, etc.) formed to include a portion protruding into the cartridge receptacle 69, and/or the like. One or more exterior surfaces of the vaporizer cartridge 52 can include corresponding recesses (not shown in FIG. 1A) that can fit and/or otherwise snap over such detents or protruding portions when the vaporizer cartridge 52 is inserted into the cartridge receptacle 69 on the vaporizer body 50. When the vaporizer cartridge 52 and the vaporizer body 50 are coupled (e.g., by insertion of an end of the vaporizer cartridge 52 into the cartridge receptacle 69 of the vaporizer body 50), the detents or protrusions of the vaporizer body 50 may fit within and/or otherwise be held within the recesses of the vaporizer cartridge 52 to hold the vaporizer cartridge 52 in place when assembled. Such an assembly can provide enough support to hold the vaporizer cartridge 52 in place to ensure good contact between the at least two cartridge contacts 65 and the at least two receptacle contacts 62, while allowing release of the vaporizer cartridge 52 from the vaporizer body 50 when a user pulls with reasonable force on the vaporizer cartridge 52 to disengage the vaporizer cartridge 52 from the cartridge receptacle 69.

In some implementations, the cartridge receptacle 69 may have a non-circular cross-section transverse to the axis along which the vaporizer cartridge 52 is inserted into the cartridge receptacle 69. For example, the non-circular cross-section may be approximately rectangular, approximately elliptical (e.g., have an approximately oval shape), non-rectangular but with two sets of parallel or approximately parallel opposing sides (e.g., having a parallelogram-like shape), or other shapes having rotational symmetry of at least order two. In this context, approximate shapes indicate that a basic likeness to the described shape is apparent, but that sides of the shape in question need not be completely linear and vertices need not be completely sharp. Rounding of both or either of edges or vertices of the cross-sectional shape is contemplated in the description of any non-circular cross-section referred to herein.

The at least two cartridge contacts 65 and the at least two receptacle contacts 62 can take various forms. For example, one or both sets of contacts may include conductive pins, tabs, posts, receiving holes for pins or posts, or the like. Some types of contacts may include springs or other features to facilitate better physical and electrical contact between the contacts on the vaporizer cartridge and the vaporizer body. The electrical contacts may optionally be gold-plated, and/or can include other materials.

An atomizer component for a vaporizer device, consistent with features of one or more implementations of the current subject matter, may provide advantages and improvements relative to current vaporizer configurations, methods of manufacture, and the like, while also introducing additional benefits as described herein.

Figure 1B:
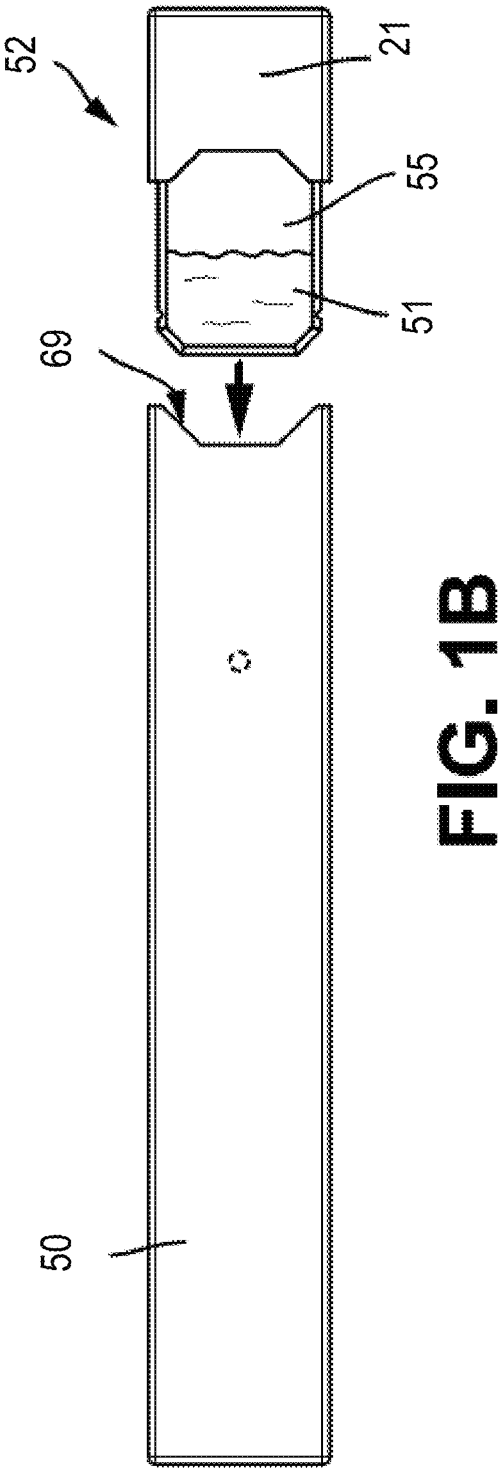
FIG. 1B is a schematic representation of a vaporizer and vaporizer cartridge.

1B illustrates an embodiment of a vaporizer body 50 having a cartridge receptacle 69 into which the vaporizer cartridge 52 may be releasably inserted. FIG. 1B shows a top view of a vaporizer device 100 illustrating the vaporizer cartridge 52 positioned for insertion into the vaporizer body 50. When a user puffs on the vaporizer device 100, air may pass between an outer surface of the vaporizer cartridge 52 and an inner surface of a cartridge receptacle 69 on the vaporizer body 50. Air can then be drawn into an insertable end of the cartridge 52, through the vaporization chamber that includes or contains the heating element and wick, and out through an outlet of the mouthpiece 21 for delivery of the inhalable aerosol to a user. The reservoir 55 of the vaporizer cartridge 52 may be formed in whole or in part from translucent material such that a level of vaporizable material is visible within the vaporizer cartridge 52. The mouthpiece 21 can be a separable component of the vaporizer cartridge 52 or may be integrally formed with other component(s) of the vaporizer cartridge 52 (e.g., formed as a unitary structure with the reservoir 55 and/or the like).

Further to the discussion above regarding the electrical connections between a vaporizer cartridge 52 and a vaporizer body 50 being reversible such that at least two rotational orientations of the vaporizer cartridge 52 in the cartridge receptacle 69 are possible, in some vaporizer devices, the shape of the vaporizer cartridge 52, or at least a shape of the end of the vaporizer cartridge 52 that is configured for insertion into the cartridge receptacle 69, may have rotational symmetry of at least order two. In other words, the vaporizer cartridge 52 or at least an insertable end of the vaporizer cartridge 52 may be symmetrical upon a rotation of 180° around an axis along which the vaporizer cartridge 52 is inserted into the cartridge receptacle 69. In such a configuration, the circuitry of the vaporizer device 100 may support identical operation regardless of which symmetrical orientation of the vaporizer cartridge 52 occurs.

Figure 1C:
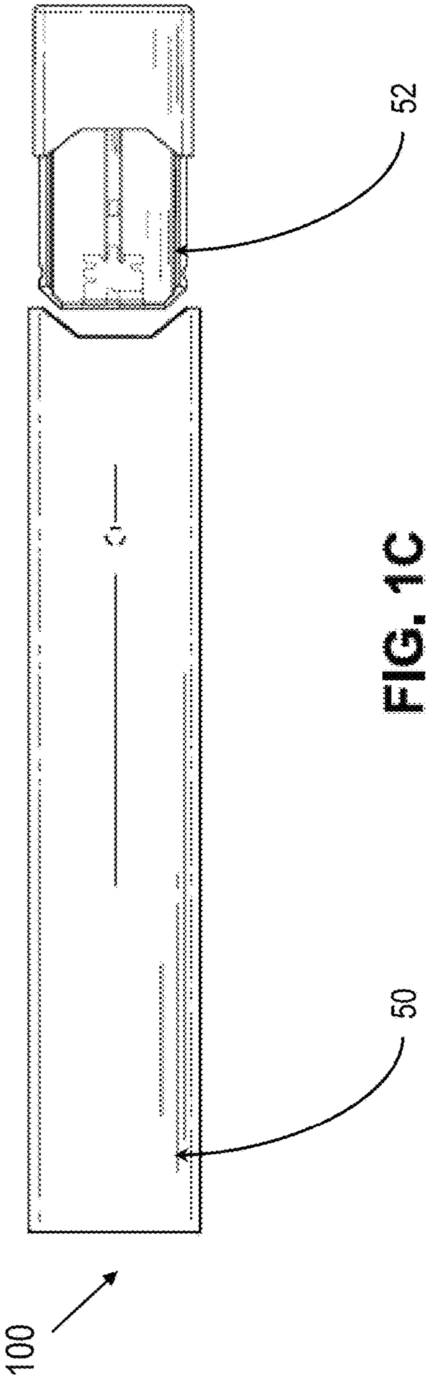
FIG. 1C is a front view of a vaporizer and an embodiment of a vaporizer cartridge.
Figure 1D:
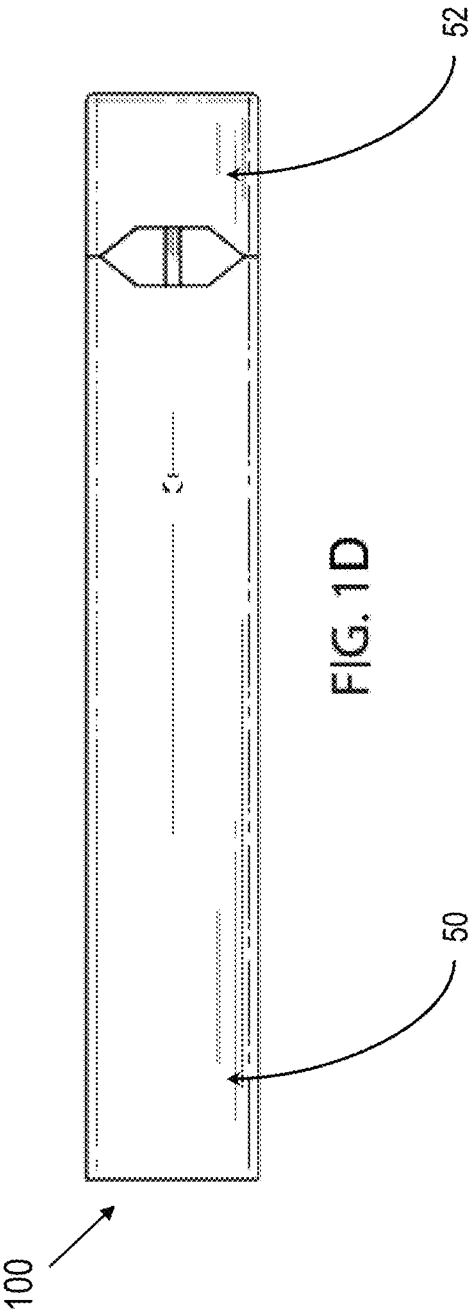
FIG. 1D is a front view of a vaporizer cartridge coupled to a vaporizer.

FIGS. 1C-1D illustrate example features that may be included in vaporizer devices consistent with implementations of the current subject matter. FIGS. 1C and 1D show top views of an example vaporizer device 100 before (FIG. 1C) and after (FIG. 1D) connecting a vaporizer cartridge 52 to a vaporizer body 50.

Figure 1E:
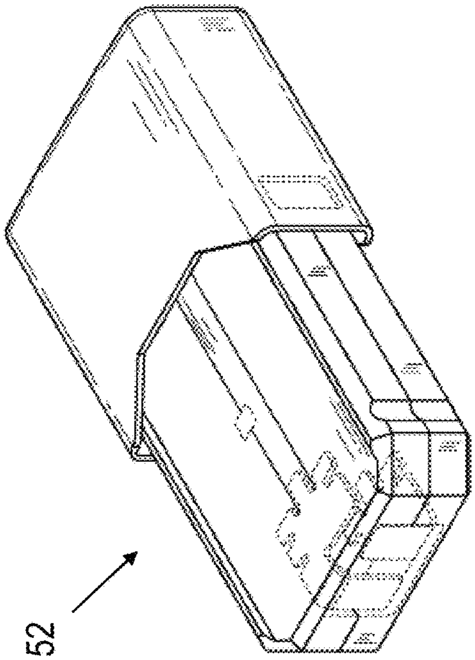
FIG. 1E is a perspective view of a vaporizer cartridge.

FIG. 1E illustrates a perspective view of one variation of a vaporizer cartridge 52 holding a liquid vaporizable material 51. Any appropriate vaporizable material 51 may be contained within the vaporizer cartridge 52 (e.g., within a reservoir 140), including solutions of nicotine or other organic materials.

Figure 1F:
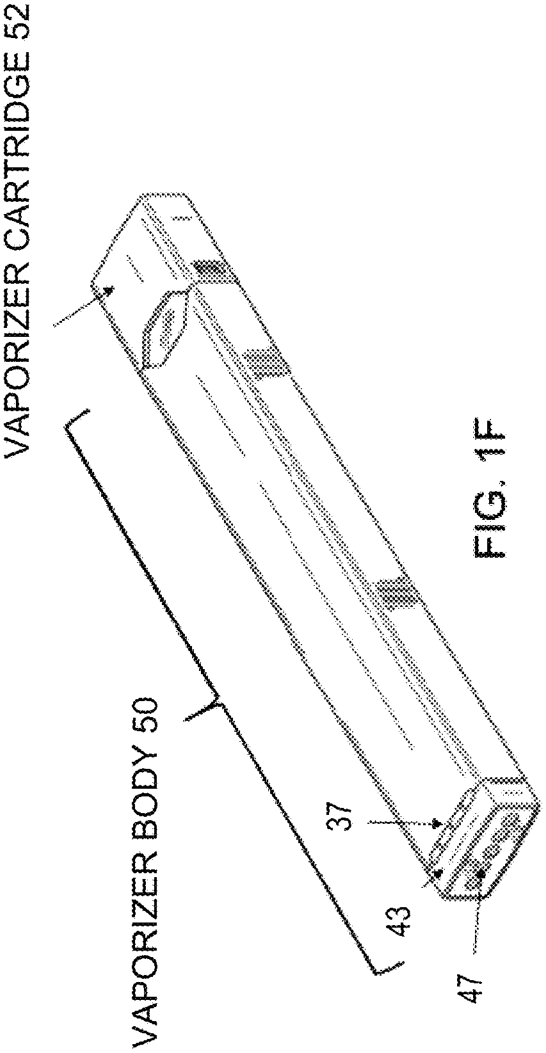
FIG. 1F is a perspective view of another embodiment of a vaporizer cartridge coupled to a vaporizer.

FIG. 1F shows a perspective view of another example of a vaporizer device 100 including a vaporizer body 50 coupled to a separable vaporizer cartridge 52. As illustrated, the vaporizer device 100 can include one or more outputs 37 (e.g., LEDs) configured to provide information to a user based on a status, mode of operation, and/or the like, of the vaporizer device 100. In some aspects, the one or more outputs 37 can include a plurality of LEDs (e.g., two, three, four, five, or six LEDs). The one or more outputs 37 (e.g., each individual LED) can be configured to display light in one or more colors (e.g., white, red, blue, green, yellow etc.). The one or more outputs 37 can be configured to display different light patterns (e.g., by illuminating specific LEDs, varying a light intensity of one or more of the LEDs over time, illuminating one or more LEDs with a different color, and/or the like) to indicate different statuses, modes of operation, and/or the like of the vaporizer device 100. In some implementations, the one or more outputs 37 can be proximal to and/or at least partially disposed within a bottom end region 43 of the vaporizer device 100. The vaporizer device 100 may, additionally or alternatively, include externally accessible charging contacts 47, which can be proximate to and/or at least partially disposed within the bottom end region of the vaporizer device 100.

Figure 2A:
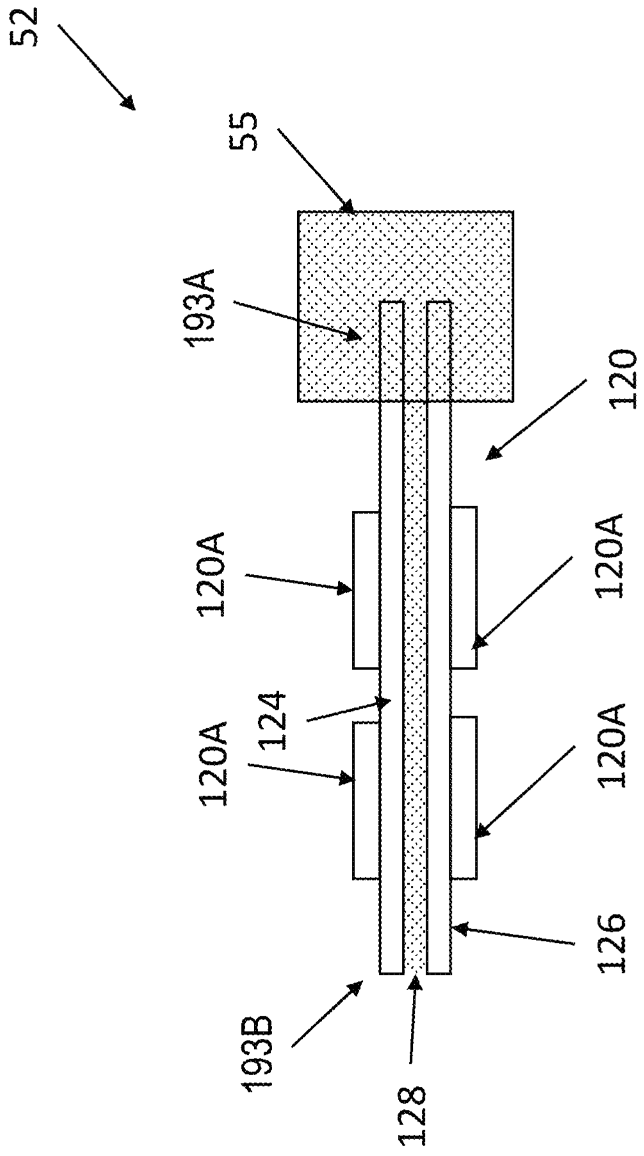
FIG. 2A illustrates a schematic of a heating element and a reservoir consistent with implementations of the current subject matter.

FIG. 2A illustrates a schematic view of a heating element 120 and a reservoir 55 consistent with implementations of the current subject matter. The heating element 120 may define and/or include a capillary structure, such as one or more capillary gaps, channels, and the like.

The heating element 120 may include one or more (e.g., two or more) rigid portions that are separated to define the capillary structure. For example, the one or more rigid portions may include a first plate portion 124 and a second plate portion 126 that are separated by a span 128 (e.g., the capillary gap, channel, etc.). The span 128 includes the distance by which the first and second plate portions 124, 126 are separated. In other words, a size of the span 128 is the distance between the first plate portion 124 and the second plate portion 126. The span 128 can allow fluid, such as the vaporizable material, to be held between and/or drawn into space between the rigid portions in various orientations. For example, the rigid portions (e.g., the first plate portion 124 and the second plate portion 126) can be desirably spaced by the span 128 to allow for fluid (e.g., vaporizable material) to be transported from and/or drawn from the reservoir 55 of the vaporizer cartridge 52 to a vaporization portion 122 (e.g., vaporization portions 122A, 122B) (in which the fluid is heated and/or vaporized to generate an aerosol) of the heating element 120, for example, via capillary action.

The span 128 can be desirably narrow to maintain strong and/or sufficient capillary forces to draw and/or otherwise retain the fluid between the rigid portions. For example, the size of the span 128 may control the rate at which the fluid is replenished within the span 128. In some implementations, the span 128 can be desirably selected and/or sized to limit or prevent the vaporizable material from draining into or out of the span 128 too quickly, and/or secure the vaporizable material within the span 128. In some implementations, the size of the span 128 can be desirably selected and/or sized to allow the span 128 to hold a sufficient amount of vaporizable material such that the span 128 does not need to be replenished during a puff, and/or can be easily replenished during and/or after a puff.

In some implementations, the size of the span 128 (e.g., a distance between the first plate portion 124 and the second plate portion 126), is approximately 0.1 mm to 0.2 mm, 0.1 mm to 0.5 mm, 0.1 mm to 1 mm, 0.2 mm to 0.5 mm, 0.3 mm to 0.5 mm, 0.5 mm to 0.7 mm, 0.7 mm to 0.9 mm, 1.0 mm to 1.5 mm, 1.5 mm to 2.0 mm, 2.0 mm to 2.5 mm, 2.5 mm to 3.0 mm, and/or other ranges therebetween. In some implementations, the size of the span 128 is approximately equal to a thickness of each of the first and second plate portions 124, 126. In some implementations, the size of the span 128 is approximately equal to a thickness of the heating element 120 at the vaporization portion 122. In some implementations, the size of the span 128 is greater than the thickness of the first and second plate portions 124, 126. In other implementations, the size of the span 128 is less than the thickness of the first and second plate portions 124, 126.

In some implementation, the size of the span 128 along a first length of the span 128 is greater than the thickness of the first and second plate portions 124, 126 and the size of the span 128 along a second length of the span 128 is less than the thickness of the first and second plate portions 124, 126.

In some implementations, a length of the span is approximately equal to a length of the first and second plate portions 124, 126. In some implementations, a length of the span is approximately equal to a length of the vaporization portion 122 of the heating element 120. In some implementations, the length of the span 128 is greater than the size of the span 128.

In some implementations, the dimensions of the rigid portions of the heating element 120 (e.g., the first and the second plate portions 124, 126) can be selected to help minimize a maximum hydrostatic potential across the rigid portions (e.g., the first plate portion 124 and/or the second plate portion 126). The size of the span 128 can also be varied at one or more portions of the heating element 120, such as portions of the heating element 120 positioned within the reservoir 55, to selectively draw a certain amount of vaporizable material (and/or return to the reservoir and/or replace vaporizable material within the reservoir, equalizing backpressure) and/or allow a certain amount of air to pass through, by, over, and/or around the heating element 120. In some implementations, the size of the span 128 at a portion of the heating element 12—for accepting a flow of vaporizable material into the heater, can be the same and/or different from the size of the span 128 at a portion of the heating element 120 for allowing the flow (e.g., return) of air to and/or from the reservoir 55.

Thus, the heating element 120 consistent with implementations of the current subject matter may efficiently control an amount of vaporizable material heated and vaporized by the vaporizer device 100. The heating element 120 may additionally and/or alternatively allow for the vaporizer device 100 to heat and vaporize the vaporizable material to generate an aerosol without the use of a wicking element, such as a fibrous wicking element.

Figure 2B:
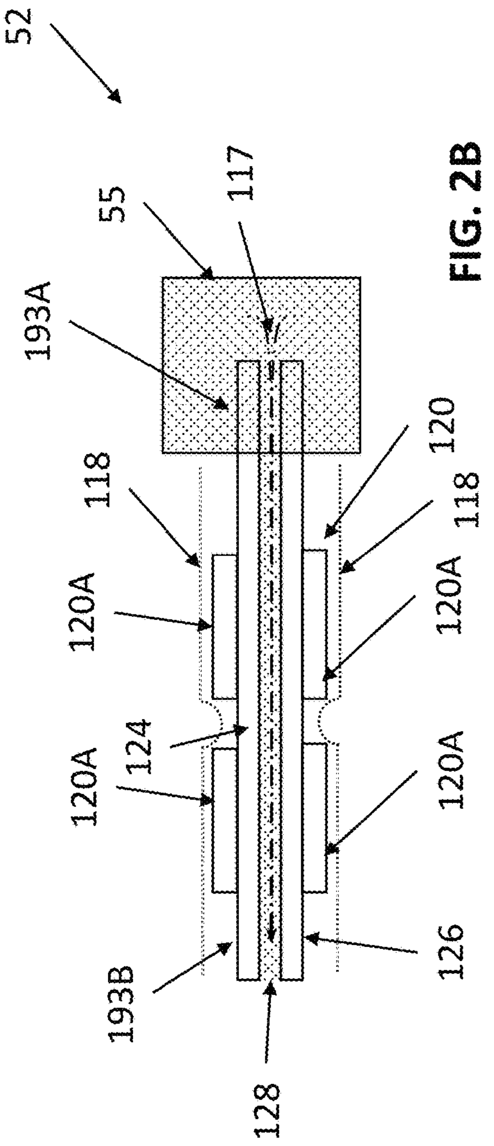
FIG. 2B illustrates a schematic of a heating element and a reservoir consistent with implementations of the current subject matter.
Figure 2C:
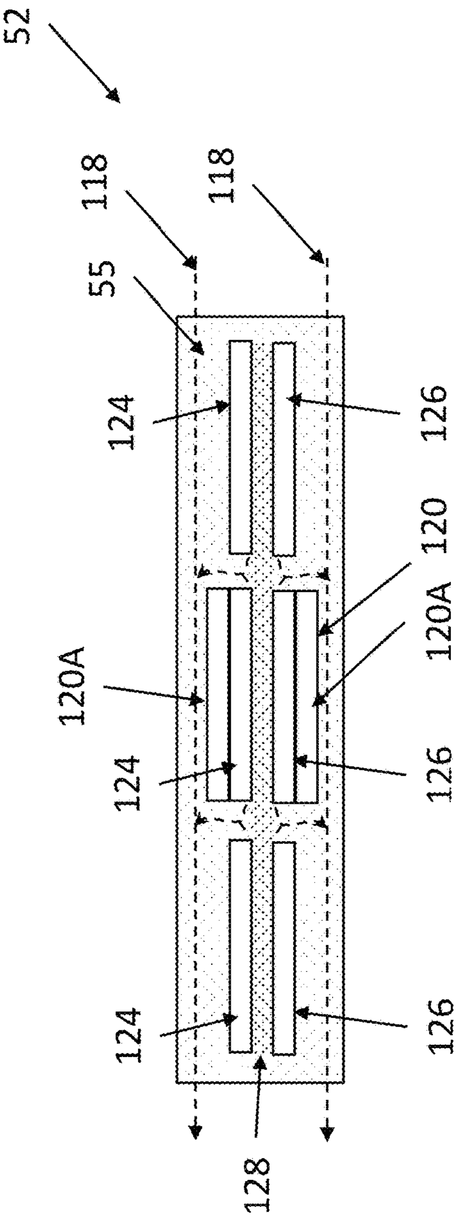
FIG. 2C illustrates a schematic of a heating element and a reservoir consistent with implementations of the current subject matter.

Referring to FIGS. 2A-2D, the heating element 120 (e.g., capillary structure) includes a first plate portion 124 and a second plate portion 126. As noted above, the first plate portion 124 and the second plate portion 126 define one or more rigid portions. Each of the first and second plate portions 124, 126 extend from a proximal end portion 193A to a distal end portion 193B. The proximal end portion 193A may be positioned within the reservoir 55 and the distal end portion 193B may be positioned out of and/or away from the reservoir 55. For example, FIG. 2B illustrates a side schematic view of the heating element 120 and the reservoir 55, with an example air flow path 118 and liquid flow path 117 and FIG. 2C illustrates a bottom schematic view of the heating element 120 and the reservoir 55, with the example air flow path 118.

Figure 2D:
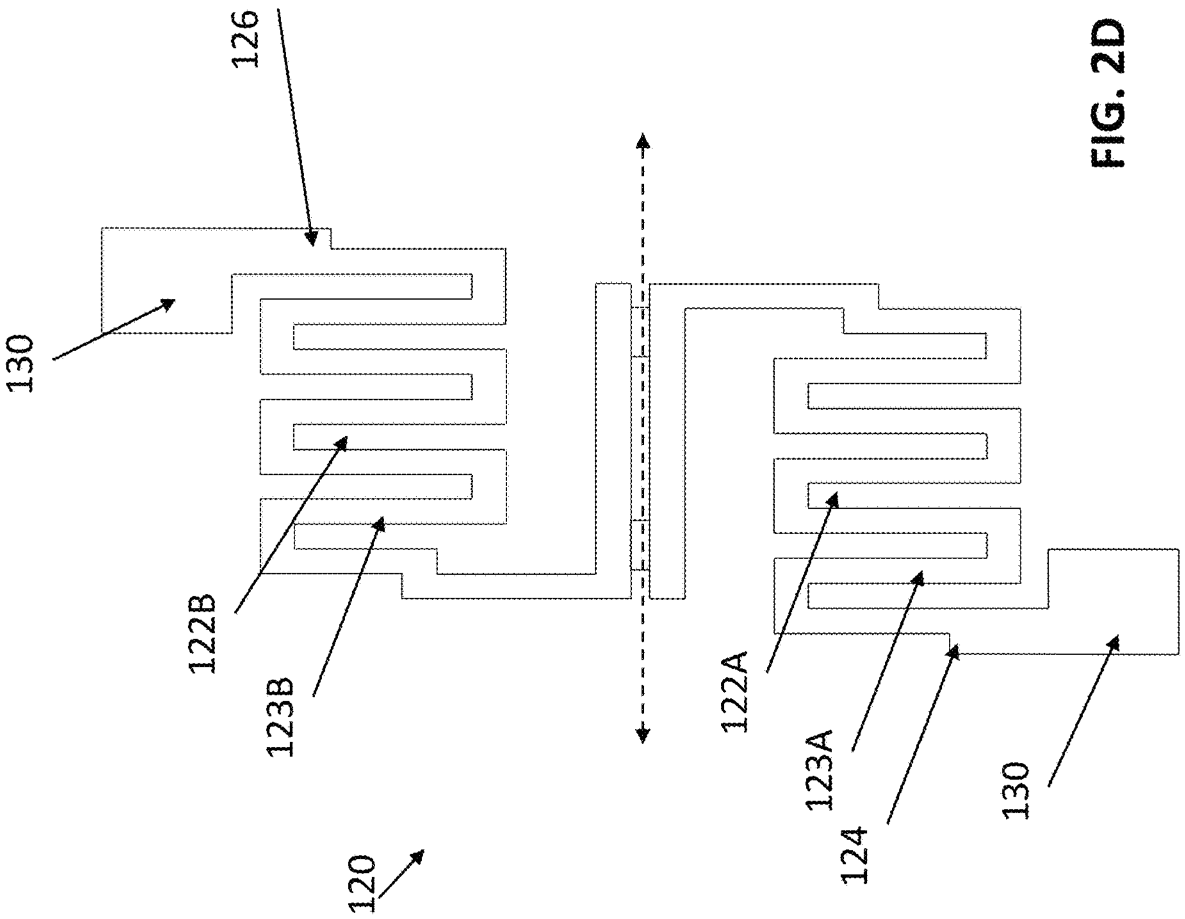
FIG. 2D illustrates a schematic of a heating element in an unfolded configuration consistent with implementations of the current subject matter.

FIG. 2D illustrates an example of the heating element 120 in an unfolded configuration. For example, the first plate portion 124 and the second plate portion 126 can be integrally formed as a single structure that is folded along a central lateral axis. In some example methods of manufacturing, the heating element 120 can be formed as a single plate through stamping, punching, laser cutting, blanking, die casting, stretch forming, and/or other manufacturing processes.

The heating element 120 can form a resistive heating structure that can be heated to draw a vaporizable material from the reservoir 55 through, for example, non-porosity driven capillarity. For example, the heating element 120 can be formed of a conductive material. In some implementations, at least a portion of the heating element 120 can be plated with a conductive material before or after the heating element 120 is formed by any of the manufacturing processes listed above, and others. Once the heating element 120 is formed, the heating element 120 can be folded along a central lateral axis between the first and second plate portions 124, 126, so that at least the vaporization portions 122A, 122B of the first and the second plate portions 124, 126 are approximately parallel to form the span 128 (e.g., capillary gap) and/or to induce capillary action. In some implementations, the first and second plate portions 124, 126 are angled relative to one another. In some implementations, the heating element 120 may also include a separate heater 120A or heater circuit traces 120A to heat the heating element 120, as explained in more detail below.

As shown in FIG. 2C, the first and second plate portions 124, 126 can be shaped to have one or more gaps to allow for vaporizable material to be vented from the capillary gap to the air path 118. The gaps can be surrounded by edges of adjacent sections of the first and second plate portions 124, 126 to allow the vaporizable material to be vented from the capillary gap to the air path 118.

Generally, when a user puffs on the mouthpiece 21 of the vaporizer cartridge 52, air flows into the vaporizer cartridge 52 and along the air path 118. In association with the user puff, the heating element 120 may be activated, as explained below. When the heating element 120 is activated, a temperature increase results due to current flowing through the heating element 120 to generate heat. The heat is transferred to some amount of the vaporizable material through conductive, convective, and/or radiative heat transfer such that at least a portion of the vaporizable material vaporizes. The heat transfer can occur to vaporizable material in the reservoir and/or to vaporizable material positioned within the capillary gap. The air passing into the vaporizer cartridge 52 flows along the air path 118, stripping away the vaporized vaporizable material from the heating element 120, as shown in FIG. 2C. In such implementations, waste heat may be limited as heat would not be freely conducted into the reservoir 55 and/or other portions of the vaporizer cartridge 52.

FIGS. 3A-9 illustrate an example of the vaporizer cartridge 52 (or portions thereof) in which a heating element 120 may be incorporated consistent with some implementations of the current subject matter. The vaporizer cartridge 52 may be used and/or otherwise coupled with a vaporizer body 50 (not shown) having a battery and control circuitry, together configured to generate an inhalable vapor by heating a vaporizable material before and/or as the vaporizable material enters the heating element 120, from which it can be vaporized.

The vaporizer cartridge 52 can include a reservoir (or tank) 55 for holding a vaporizable material (such as an oil, a solution, or some other fluid or liquid), a mouthpiece 21, an air inlet 106, and an atomizer chamber 110 positioned within or in contact with fluid contained within the reservoir 55. As shown in FIG. 3B, the atomizer chamber 110 can include a heating element housing 112, a cartridge contact 65 (such as a receptacle, terminal, etc.), an atomizer chamber air inlet 116, and the heating element 120. The atomizer chamber 110 can at least partially surround and/or support the heating element 120. The atomizer chamber 110 can be, according to some aspects, secured within the vaporizer cartridge 52 by, for example, ultrasonic welding, radiofrequency (RF) welding, a snap-fit connection, or by any other secure connection method. In some implementations, the atomizer chamber 110 is removable from the vaporizer cartridge 52.

Figure 3A:
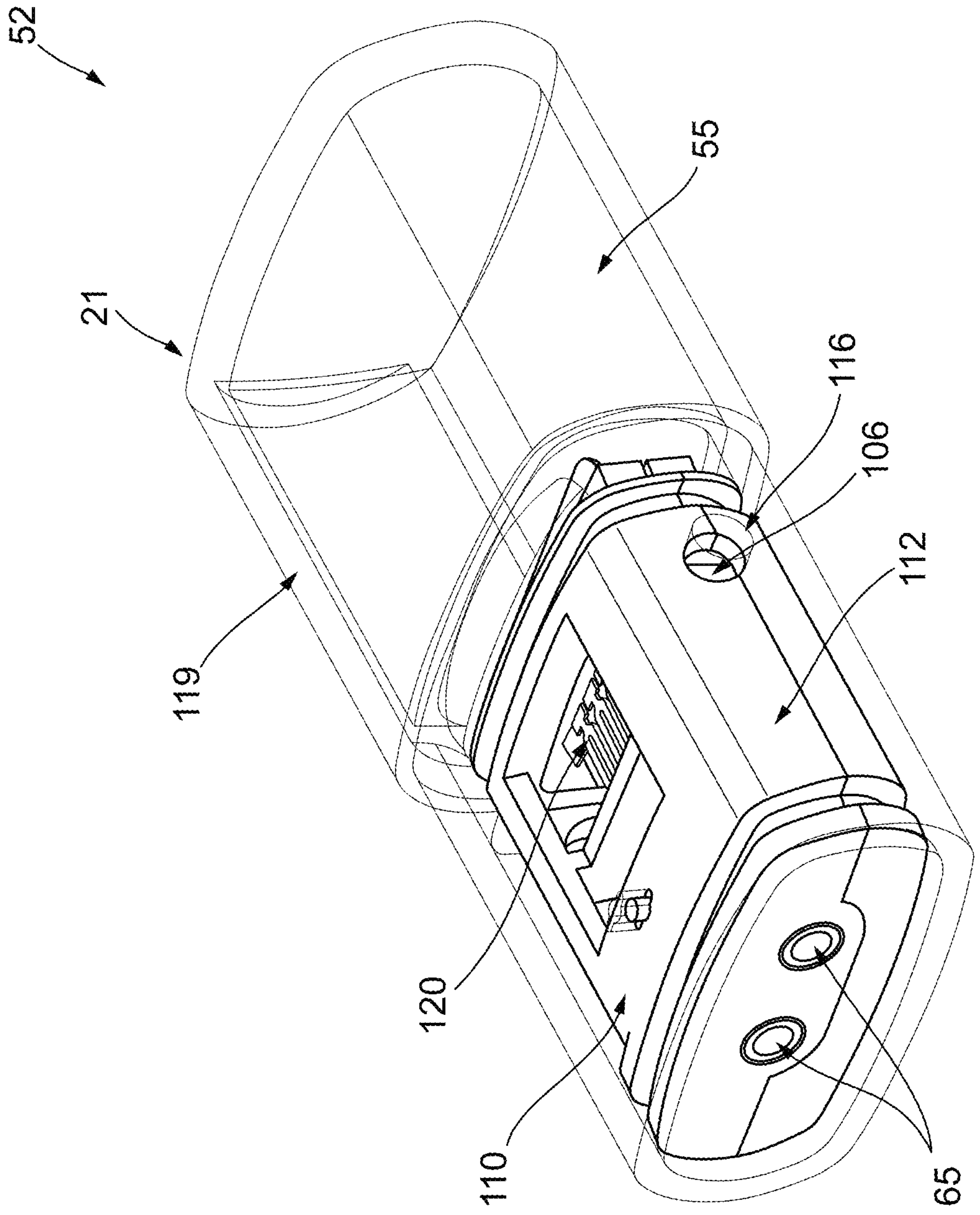
FIG. 3A illustrates a perspective view of a vaporizer cartridge in which a heating element is incorporated consistent with implementations of the current subject matter.
Figure 3B:
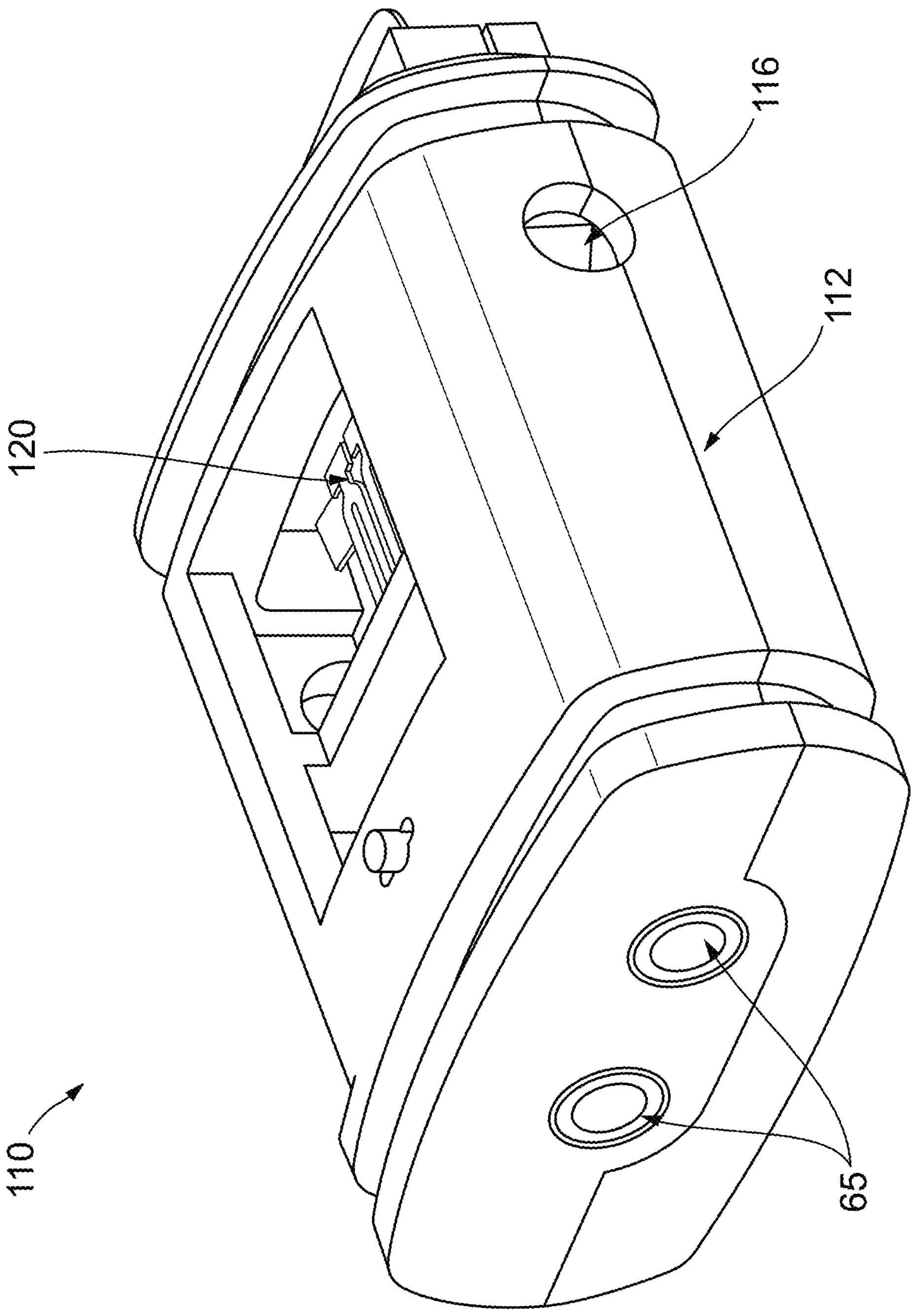
FIG. 3B illustrates a perspective view of an atomizer chamber of a vaporizer cartridge in which a heating element is incorporated consistent with implementations of the current subject matter.
Figure 4:
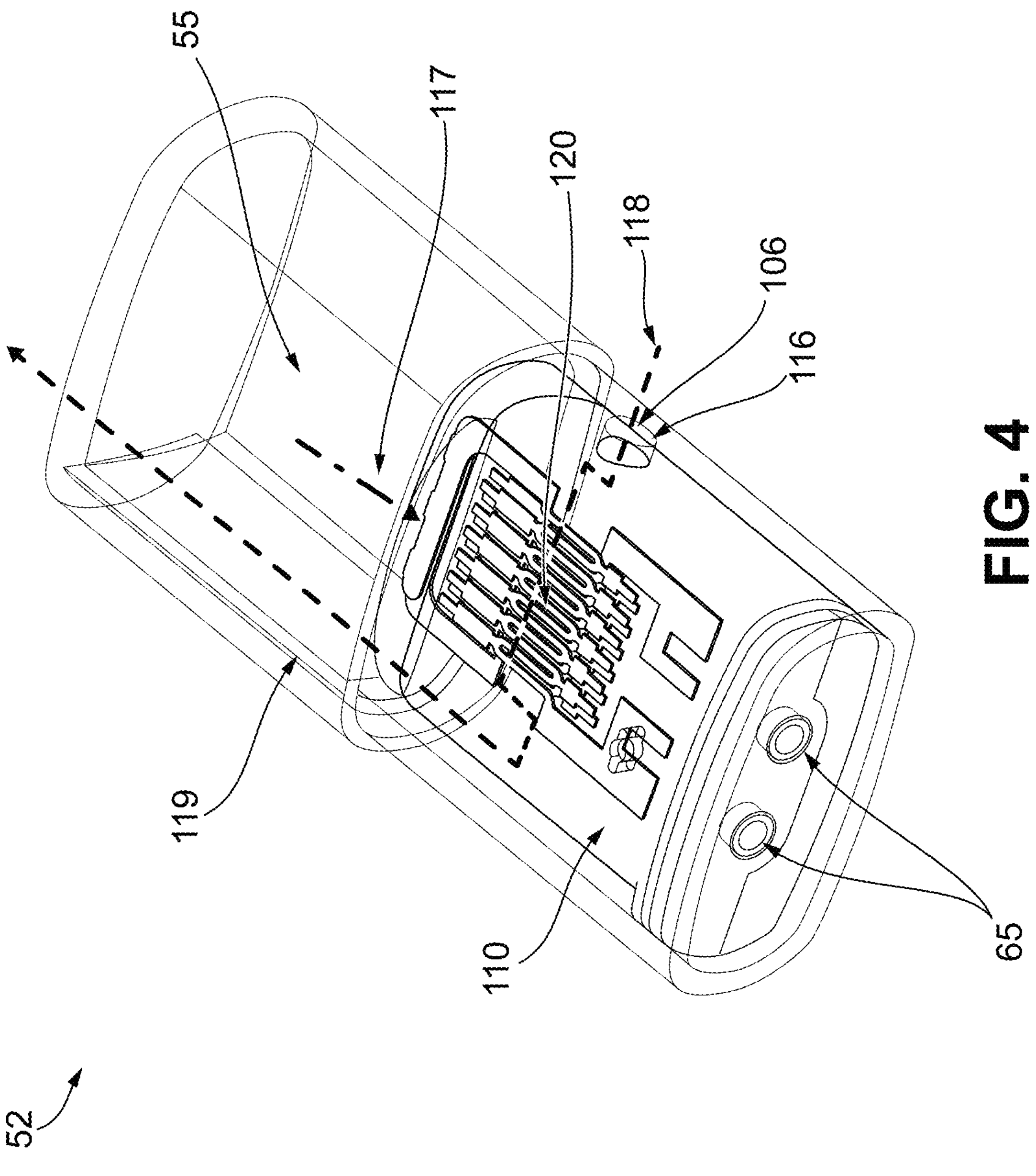
FIG. 4 illustrates a perspective view of a vaporizer cartridge in which a heating element is incorporated consistent with implementations of the current subject matter.

As shown in FIG. 3A, the cartridge 52 may include at least two cartridge contacts 65, which can include any shape and/or structure that receives and/or contacts an electrical connector and/or power supply 8. In some implementations, the cartridge contact 65 includes at least four cartridge contacts 65 for further temperature, electrical resistance, and/or sensor readings or measurements.

The cartridge contacts 65 can be configured to receive or contact corresponding receptacle contacts 62 of the vaporizer body 50 when the cartridge 52 is assembled to the vaporizer body 50. The cartridge contacts 65 can extend inwardly from a bottom surface of the atomizer chamber 110 toward an interior volume of the atomizer chamber 110. In some implementations, an upper end portion of the cartridge contacts 65 can contact and/or otherwise couple with at least a portion of the heating element 120, such as the contact portions 130, at the contact region 109 (see FIG. 6). In some embodiments, the cartridge contacts 65 are secured to the contact portions 130 by, for example, spot-welding, ultrasonic welding, radio-frequency (RF) welding, a snap-fit connection, or by any other secure connection method. In some implementations, the contact region 109 can overlap with at least a portion of the heater region 108. In some implementations, the cartridge contacts 65 can extend into the heater region 108 to contact a portion of the heating element 120.

The cartridge contacts 65 can provide an electrical connection between the power supply 8, such as the battery, and the contact portions 130 of the heating element 120, for example, via the receptacle contacts 62 of the vaporizer body 50. The electrical connection between the power supply 8 and the contact portions 130 of the heating element 120 can allow at least the vaporization portion 122 to be heated, as described in more detail herein.

Figure 5B:
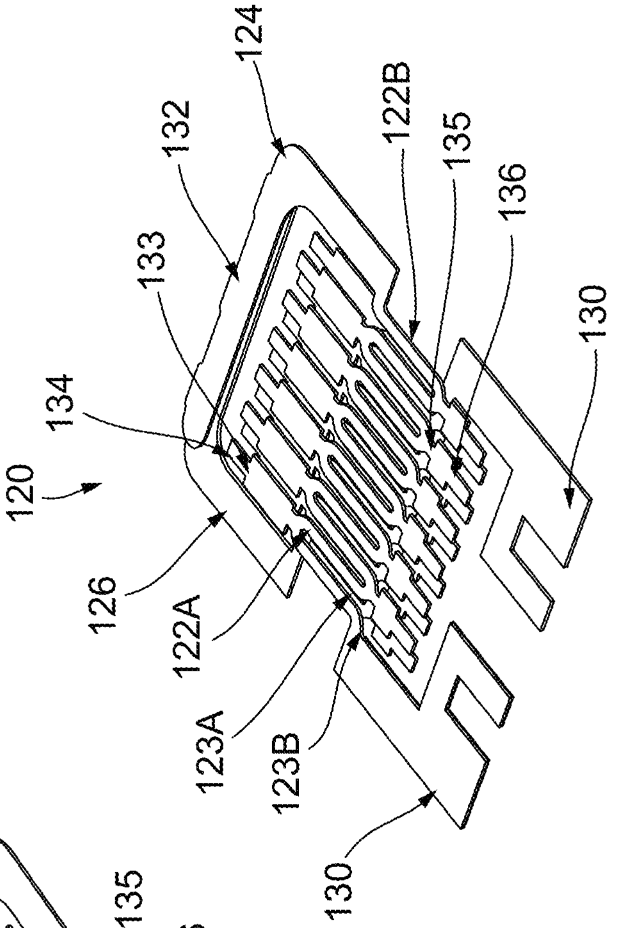
FIG. 5B illustrates a perspective view of a heating element consistent with implementations of the current subject matter.
Figure 5A:
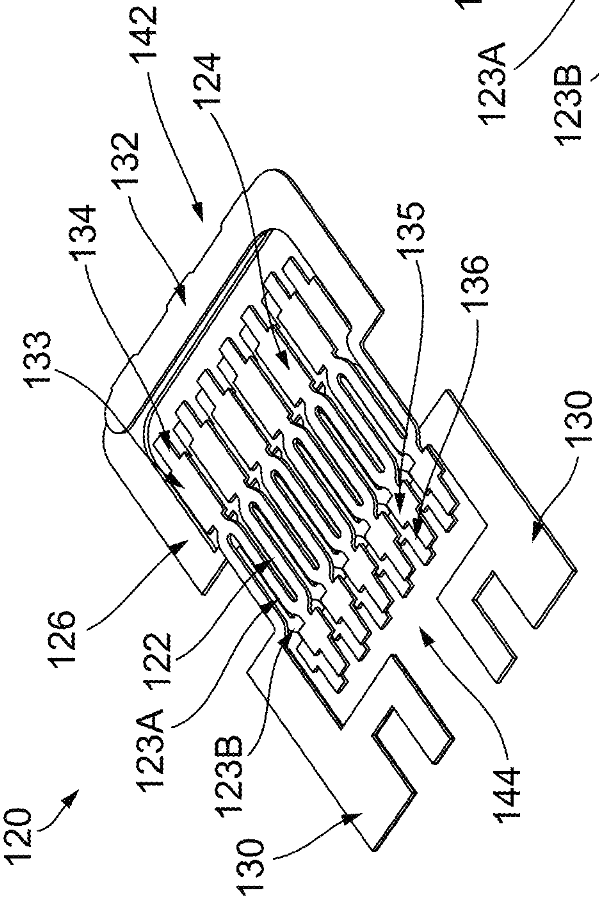
FIG. 5A illustrates a perspective view of a heating element consistent with implementations of the current subject matter.

FIG. 5A illustrates a perspective view of the heating element 120. According to some implementations, the heating element 120 can be formed as a pair of connected and opposing plates or rigid portions. The heater element 120 includes a first plate portion 124 and a second plate portion 126. The first plate portion 124 and/or the second plate portion 126 can include a respective contact portion 130 (which can electrically connect or otherwise communicate with, for example, a respective one of the cartridge contacts 65), a vaporization portion 122 comprised of opposing tines 123A, 123B (e.g., metal tines), an upper connector 132, upper heating element supports 134, and lower heating element supports 136.

The first plate portion 124 and/or the second plate portion 126 can include the vaporization portion 122. The vaporization portion 122 can have an approximate sinusoidal shape (or cross-sectional shape). In some implementations, the vaporization portion 122 can have an approximate rectangular, oval, or other shape (or cross-sectional shape). The vaporization portion 122 can be shaped to have one or more gaps within the vaporization portion to allow for vaporizable material to be vented from the capillary gap to the air path 118. For example, the gaps can be surrounded by edges of adjacent sections of the vaporization portion 122 to allow the vaporizable material to be vented from the capillary gap to the air path 118.

The first plate portion 124 and the second plate portion 126 of the heating element 120 can be integrally formed. For example, the first plate portion 124 and the second plate portion 126 can be formed by a single plate that is folded along a central lateral axis of the plate. FIG. 5B illustrates a perspective view of the atomizer component 120, with an example of the first plate portion 124 highlighted. In other implementations, the first plate portion 124 and the second plate portion 126 can be separately formed and coupled at connector 132. In yet other embodiments, the first plate portion 124 and the second plate portion 126 can remain separated after formation, but electrically connected in another manner.

Figure 5C:
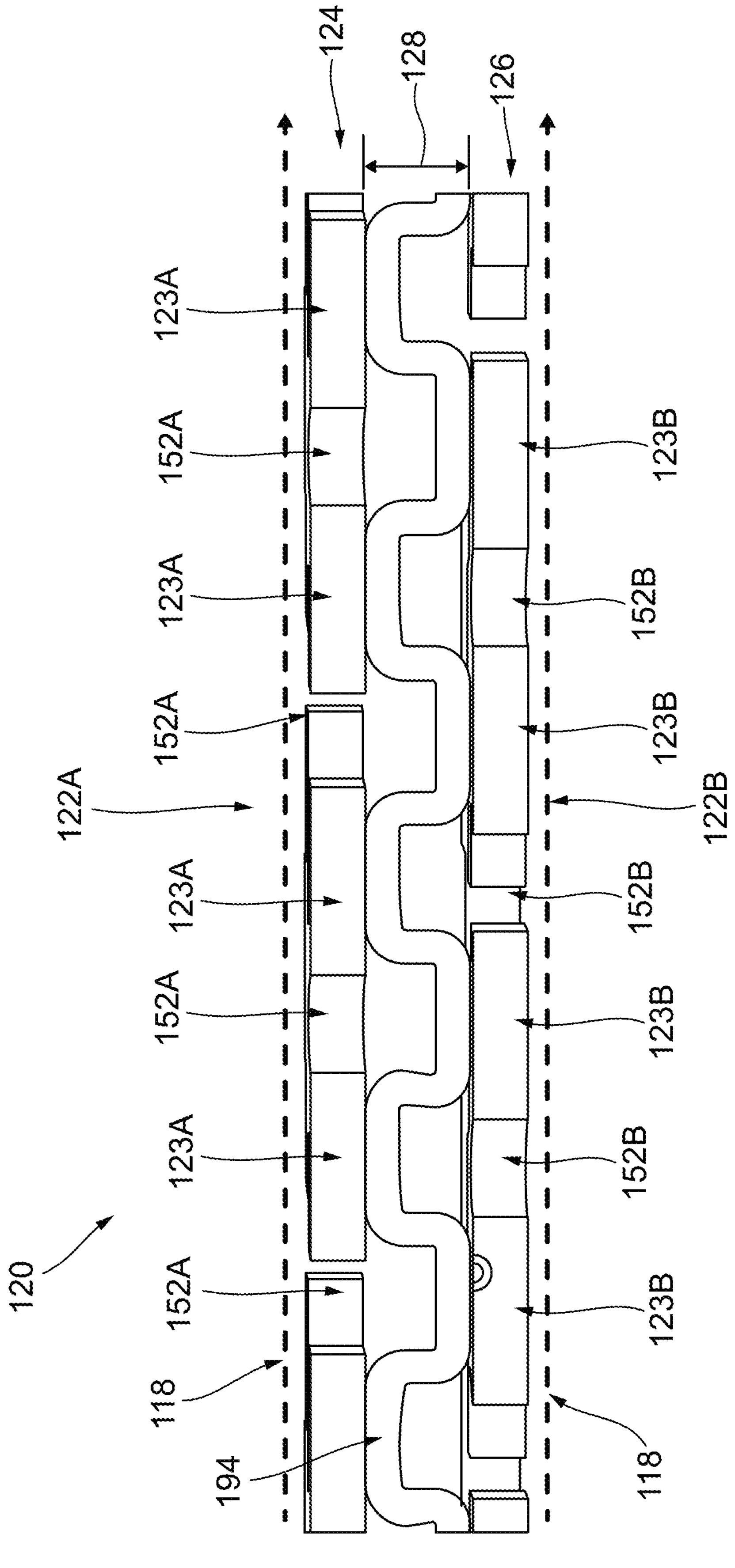
FIG. 5C illustrates a cross-sectional view of a heating element consistent with implementations of the current subject matter.

FIG. 5C illustrates a top cross-sectional view of the heating element 120 consistent with certain implementations. As shown in FIG. 5C, the first plate portion 124 can have an upper vaporization portion 122A and the second plate portion 126 can have a lower vaporization portion 122B. A distance between the upper and lower vaporization portions 122A and 122B can be adjusted depending on the desired capillary forces for drawing vaporizable material into and/or retaining vaporizable material within the span 128 between the first and second plate portions 124, 126. In some implementations, a size of the span 128 (e.g., the capillary gap) can be constant from a fluid region 107 (shown in FIG. 6) all the way through a heater region 108 (shown in FIG. 6). Additionally and/or alternatively, the size of the span 128 can be varied along the fluid path 117. For example, the size of the span 128 can narrow as fluid is drawn from the proximal fluid region 107 to the distal heater region 108, thereby creating greater capillary pressure differential along the fluid path 117.

Referring to FIG. 5C, the upper vaporization portion 122A can have gaps 152A formed between adjacent heater tines 123A of the upper vaporization portion 122A. The lower vaporization portion 122B can have gaps 152B formed between adjacent heater tines 123B of the lower vaporization portion 122B. The upper and lower vaporization portions 122A, 122B can be sized and offset in such a way that the upper and lower heater tines 123A and 123B at least partially overlap one another in a lower-upper direction. In this configuration, the upper gaps 152A may be generally opposing respective lower heater tines 123B. The lower gaps 152B may generally oppose respective upper heater tines 123A, such as in a lateral direction. Such implementations can desirably allow for the vaporizable material 194 to be held within the span 128 across at least a length of the heating element 120 (e.g., a substantial portion), such as across the entire cross-section of the heating element 120, between the first and second plate portions 124 and 126. As shown in the example heating element 120 of FIG. 5C, the cross-section of the vaporizable material held within the capillary gap between these opposed and offset heater tines 123A, 123B can have an approximately sinusoidal shape, due at least in part to surface tension of the fluid from tine to tine. This cross-sectional shape of capillaried vaporizable material can be desirable to limit air gaps positioned within the capillary gap and/or to maximize the amount of vaporizable material that can be held within the capillary gap. The offset gaps 152A and 152B allow vaporizable material being heated below (e.g., between first and second plate portions 124, 126) and to the sides of each gap 152A to efficiently vaporize and be entrained within the air path 118.

Figure 6:
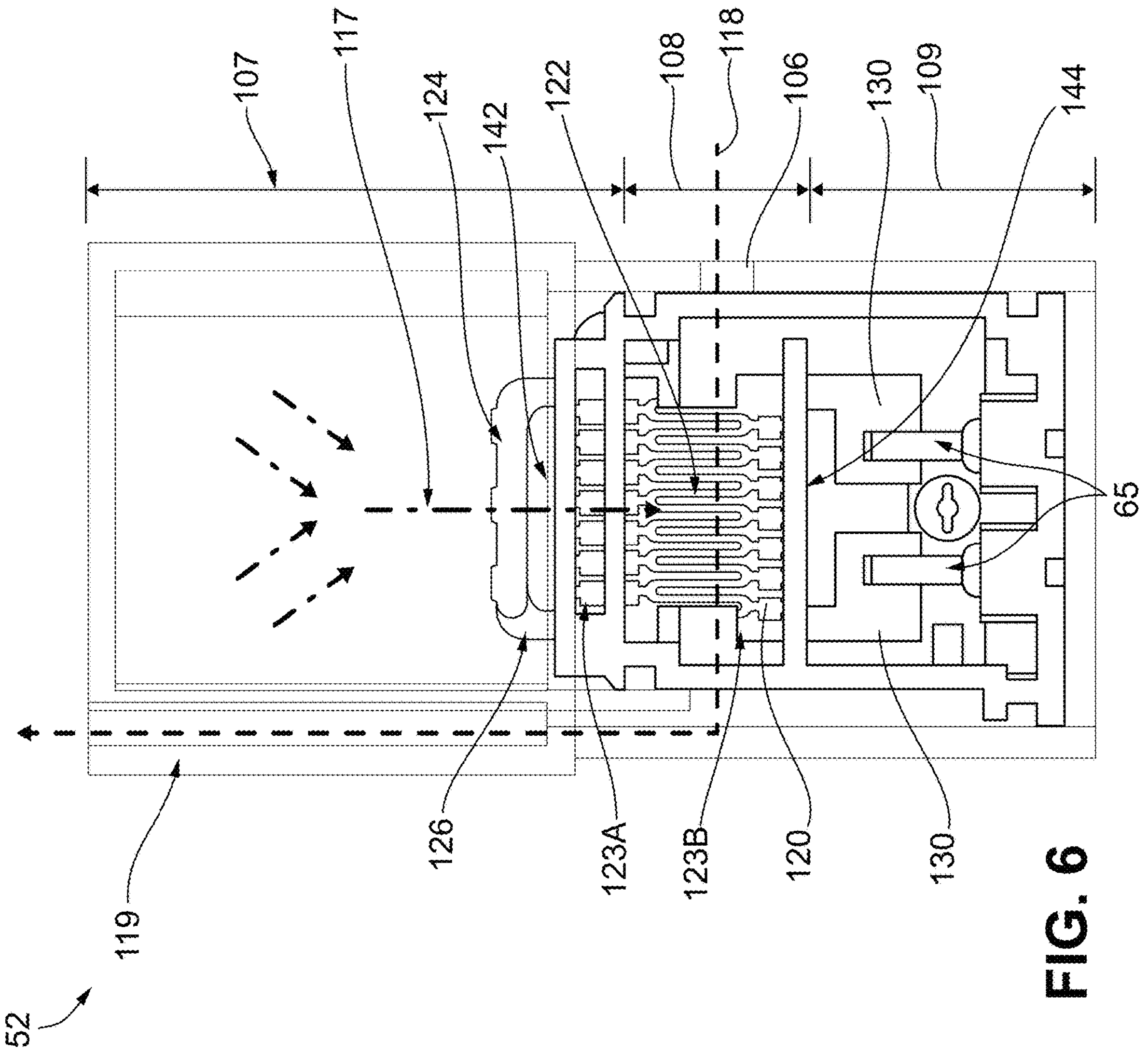
FIG. 6 illustrates a cross-sectional view of a vaporizer cartridge in which a heating element is incorporated consistent with implementations of the current subject matter.

FIG. 6 illustrates a cross-sectional view of a vaporizer cartridge 52 in which the heating element 120 is incorporated consistent with implementations of the current subject matter. As shown in FIG. 6, the vaporizer cartridge 52 includes a fluid region 107, a heater region 108, and a contact region 109. The fluid region 107 illustrates at least a portion of the vaporizer cartridge 52 in contact with the vaporizable material. In some implementations, at least a portion of the heating element 120 is in fluid communication with the vaporizable material in at least one region of the vaporizer cartridge 52.

Figure 7A:
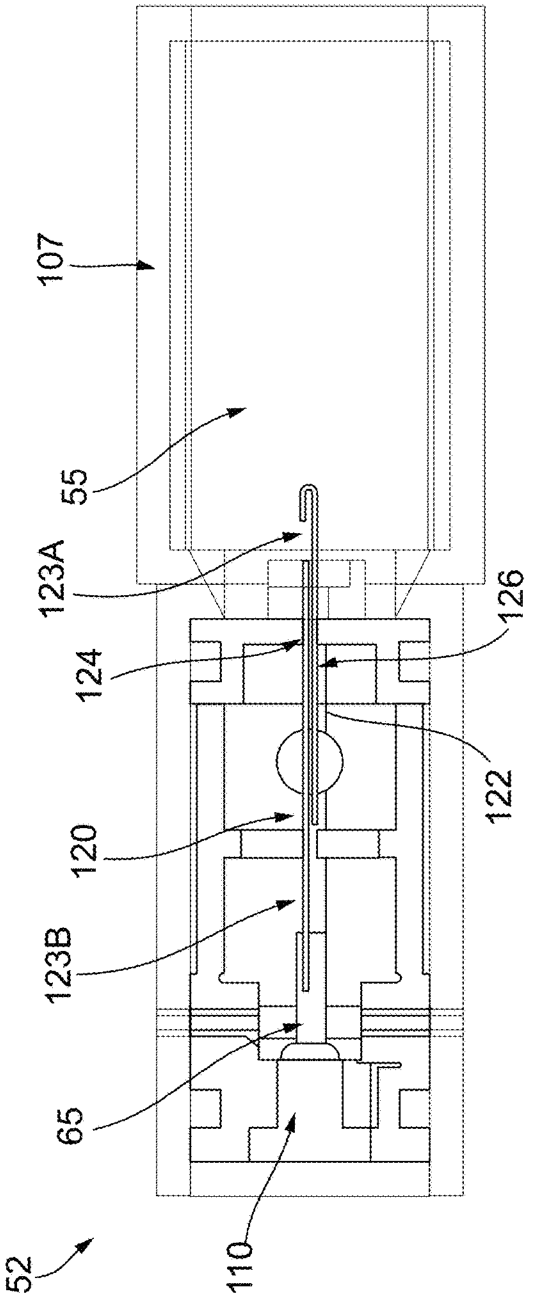
FIG. 7A illustrates a cross-sectional side view of a vaporizer cartridge in which a heating element is incorporated consistent with implementations of the current subject matter.
Figure 7B:
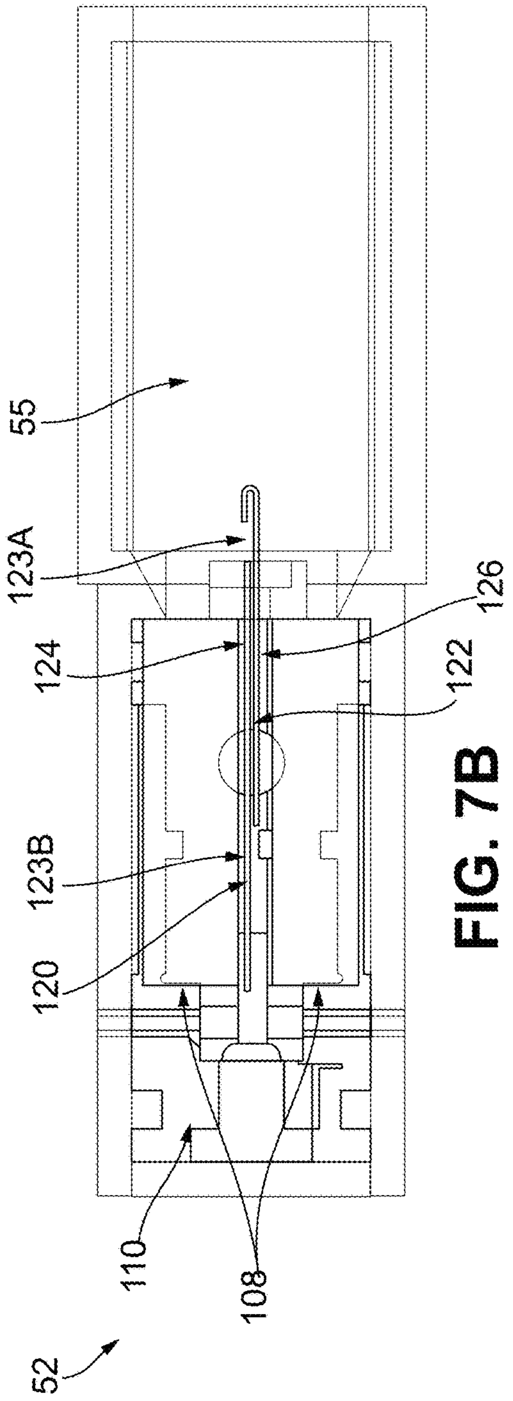
FIG. 7B illustrates a cross-sectional side view of a vaporizer cartridge in which a heating element is incorporated consistent with implementations of the current subject matter.

FIGS. 7A and 7B illustrates a cross-sectional side view of one embodiment of the vaporizer cartridge 52. FIG. 7B shows the fluid region 107 highlighted. The fluid region 107 can include the reservoir 55, and at least a proximal portion 123 of the heating element 120 (in particular, in one embodiment, an exposed volume between first and second plate portions 124, 126 of the heating element 120), such that fluid vaporizable material can enter the gap between first and second plate portions 124, 126 and be wicked or otherwise be drawn towards the heater region 108, between the first and second plate portions 124, 126, by capillary action.

FIG. 7B illustrates the same side cross-sectional view of the exemplary vaporizer cartridge 52, in which the heater region 108 is highlighted. Here, the heater region 108 includes at least a distal portion 193B of the heating element 120 (in particular, in one embodiment, an exposed volume between first and second plate portions 124, 126 of the vaporization portion 122 of the heating element 120), such that the fluid vaporizable material can vaporize from the gap between first and second plate portions 124, 126. The vaporization portion 122 can be at least partially surrounded by air (e.g., see FIGS. 2B, 2C, 5C), to facilitate the vaporization of the vaporizable material that has been wicked and/or otherwise drawn from the fluid region 107 to the heater region 108. An example of the portion of the heater region 108 that is filled with at least air is highlighted in FIG. 7B.

Referring to FIGS. 2B, 2C, 5C, and 6, an air path 118 is shown. Air may be drawn in from at least one side of the vaporizer cartridge 52, such as through the air inlet 106. The air inlet 106 can be aligned with the atomizer chamber inlet 116 (see FIG. 3A). The alignment between the inlets 106, 116 can allow the air to be drawn directly from the environment or portion of the vaporizer body 50 into the atomizer chamber 110. In alternative implementations, the air inlet 106 and the atomization chamber inlet 116 can be offset. Offsetting the inlets 106, 116 can be used to control airflow rates by, for example, increasing or decreasing the amount of air that is allowed to enter the atomization chamber and/or increasing the length of the airflow path 118, thereby changing the rate that air enters the atomization chamber 110.

The air path 118 can extend through the air inlet 106 and the atomizer chamber inlet 116, and be pulled alongside, adjacent to, and/or around at least a portion of the heating element 120, such as the vaporization portion 122. In some implementations, air can be drawn from a bottom or a base of the vaporizer cartridge 52. The air path 118 through the vaporizer cartridge 52 can then pass alongside, adjacent to, and/or around the reservoir 55 in a passageway 119. The passageway 119 can extend between an outer sidewall of the reservoir 55 and an inner sidewall of the vaporizer cartridge 52, leading to the mouthpiece 21.

As shown in FIG. 6, a proximal portion 193A of the heating element 120 is in fluid communication with the reservoir 55, in effect putting a proximal portion 142 of the capillary gap in fluid communication with the reservoir 55. An opposite distal end portion 144 of the capillary gap is in the heater region 108, exposed to air, allowing external surfaces of the first and/or second plate portions 124, 126 to be exposed to the air path 118 and allowing vaporizable material drawn by capillary action from the reservoir 55 to be heated by the tines 123A, 123B of the heating element 120 and vaporized into the air path 118.

When a user puffs on the mouthpiece 21 of the vaporizer cartridge 52, air flows into the inlets 106, 116, and along the air path 118. In association with the user puff, the heating element 120 may be activated, e.g., by automatic detection of the puff via a pressure sensor, by detection of a pushing of a button by the user, by signals generated from a motion sensor, a flow sensor, a capacitive lip sensor, or other approach capable of detecting that a user is taking or about to be taking a puff or otherwise inhaling to cause air to enter the vaporizer device 100 and travel at last along the air path 118. Power can be supplied from the vaporizer device to the heating element 120 at the contact portions 130, via the cartridge contacts 65 for example, when the heating element 120 is activated.

When the heating element 120 is activated, a temperature increase results due to current flowing through the heating element 120 to generate heat. The heat is transferred to some amount of the vaporizable material through conductive, convective, and/or radiative heat transfer such that at least a portion of the vaporizable material vaporizes. The heat transfer can occur to vaporizable material in the reservoir and/or to vaporizable material drawn into the capillary gap between the first and second plate portions 124, 126. The heat transfer between the heating element 120 and the vaporizable material residing within capillary gap can occur at the vaporization portion 122. In some implementations, the vaporizable material can vaporize along one or more edges surrounding the gaps 152A, 152B formed by the opposed and offset heater tines 123A, 123B in the vaporization portion 122 of the heating element 120. The air passing into the vaporizer device 100 flows along the air path 118 through the atomizer chamber 110, stripping away the vaporized vaporizable material from the heating element 120. The vaporized vaporizable material can be condensed due to cooling, pressure changes, etc., such that it exits the mouthpiece 21 as an aerosol for inhalation by a user.

The heating element 120 may be made of various materials, such as nichrome, stainless steel, or other resistive heater materials. Combinations of two or more materials may be included in the heating element 120, and such combinations can include both homogeneous distributions of the two or more materials throughout the heating element or other configurations in which relative amounts of the two or more materials are spatially heterogeneous. For example, the heater tines 123A, 123B may have portions that are more resistive than other portions and thereby be designed to grow hotter than the other sections of the tines, for example, other sections of the tines immersed in the vaporizable material of the fluid region 107. This configuration helps to localize heating of the heating element 120 to within the vaporization portion 122.

The heating element 120 may be manufactured using one or more electrically conductive layers on or in contact with at least a portion of a surface of the heating element 120. In some examples, the one or more electrically conductive layers may include a trace pattern. In some examples, the trace pattern is cut into the heating element 120. A trace pattern may be configured to achieve a desired and/or controlled electrical resistance, and may or may not be uniform in thickness or extend along the surface of the heating element 120. The trace pattern can desirably allow the heating element 120 to be powered by a battery, such as a lithium battery. The trace pattern can desirably allow sufficient ventilation for vaporized vaporizable material to be vented under convection. Such implementations can help to keep local vapor pressure low and/or maintain vaporization at a high rate. Specific shapes, patterns, thickness, etc. of the heating element 120 may be advantageous in allowing control of heat delivery and allowing for the liquid from the reservoir 55 to be drawn to the heating element 120 (e.g., into and/or along the span 128).

Figure 9:
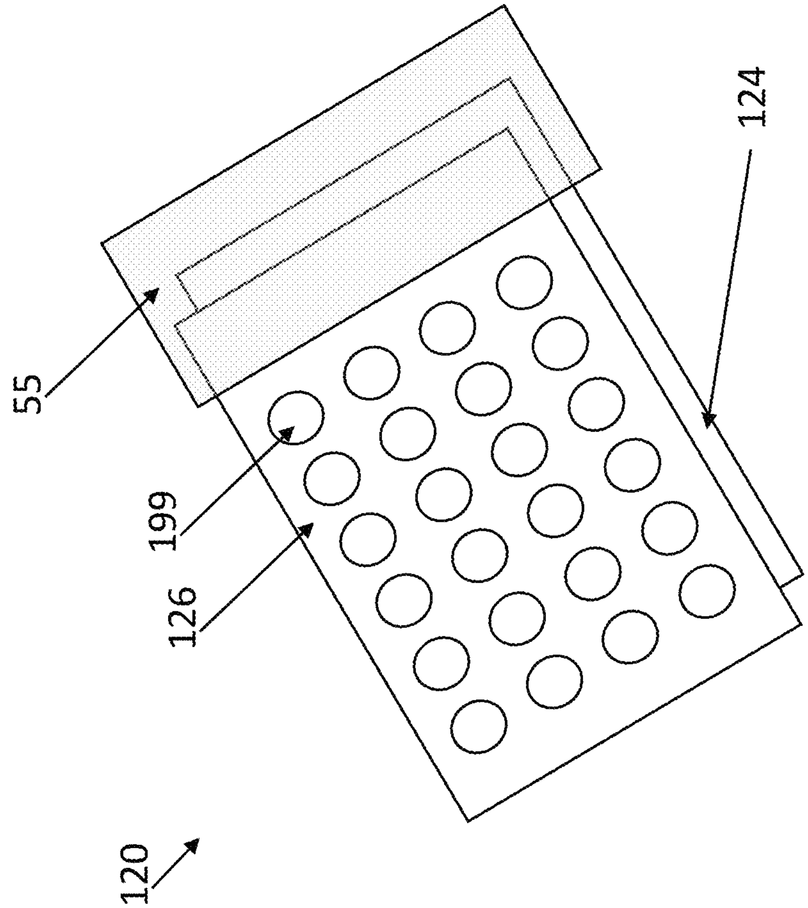
FIG. 9 illustrates a perspective view of a heating element consistent with implementations of the current subject matter.

The electrically conductive layer may be a plate or other continuous layer that covers or forms the entire surface or a portion of an external or internal surface of the heating element. Such a plate or other continuous layer may include features such as holes, micro-perforations, etc. for allowing vaporizable material from the reservoir 55 to pass through the heating element 120. For example, as shown in FIG. 9, the heating element 120 may include first and second plate portions 124, 126 that comprise perforations 199 to allow the vaporizable material to pass therethrough when the heating element 120 is heated. The electrically conductive layer may be made from any electrically conductive material, such as, for example, a nickel chromium alloy, stainless steel, nickel, platinum, gold, copper, or aluminum. As mentioned below, in some implementations, a plate including resistive material and traces can be used with another plate having perforations to allow for ventilation. Other combinations may be implemented. Such implementations may have a smaller amount of heater surface area and can reduce complexity.

Figure 8:
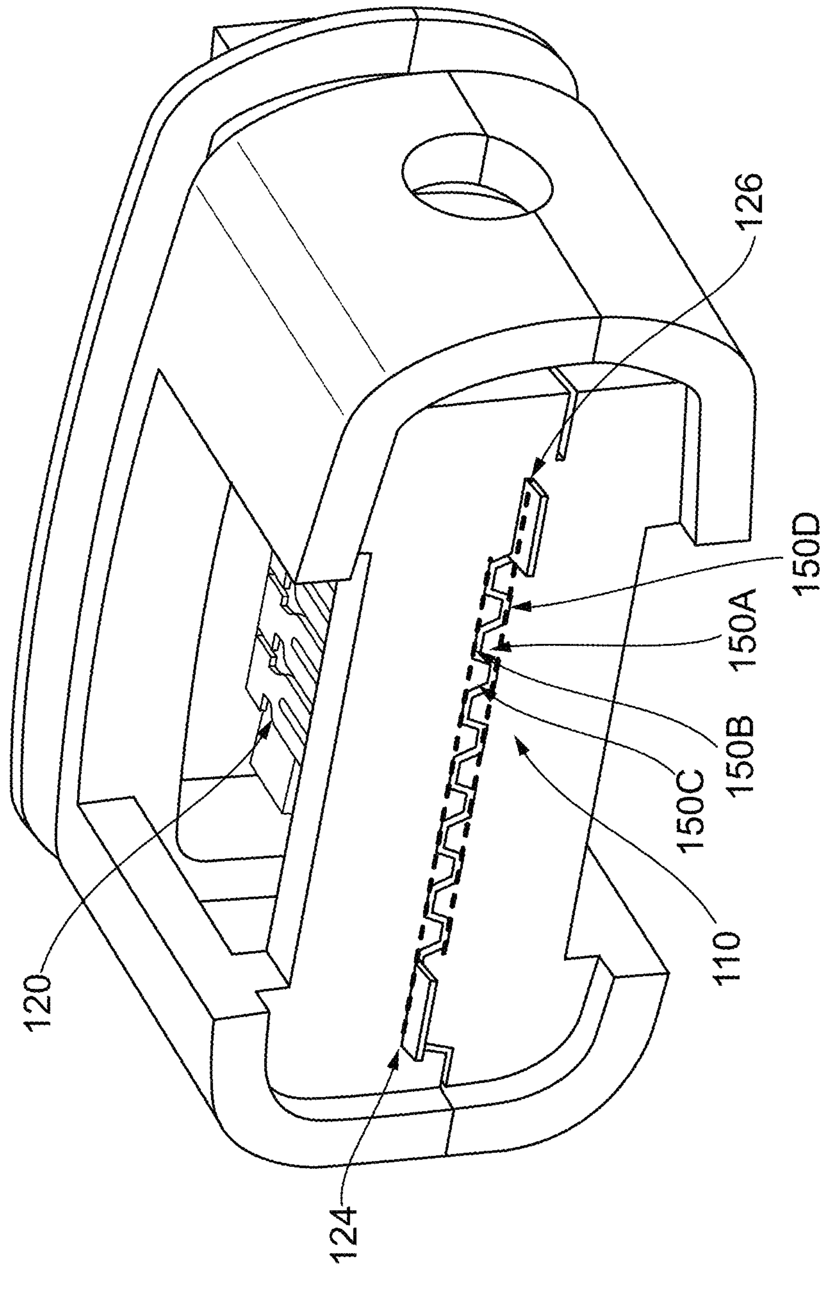
FIG. 8 illustrates a perspective cross-sectional view of an atomizer chamber of a vaporizer cartridge in which at least a portion of a heating element is incorporated consistent with implementations of the current subject matter.

Referring to FIGS. 5A and 8, the atomizer chamber 110 can at least partially surround and/or support the heating element 120. The heating element 120 can be supported by the atomizer chamber 110 by at least the upper heating element supports 134 and/or lower heating element supports 136 of the heating element 120. The upper heating element supports 134 can be spaced from the vaporization portion 122 by an upper spacer portion 133 and the lower heating element supports 136 can be spaced from the vaporization portion 122 by a lower spacer portion 135. The upper and lower spacer portions 133, 135 can reduce the amount of heat at the upper and lower heating element supports 134, 136, respectively. Such implementations can help to limit heat transferred from the heating element 120 to the atomizer chamber 110 and/or can help to limit deformation of the atomizer chamber 110.

Generally, some amount of conduction of heat into the liquid contained in the reservoir 55 may improve wicking and allow increased vaporization performance. Conduction can be more effectively controlled by affecting thermal gaps between the vaporization portion 122 and the reservoir 55. The upper spacer portion 133 can provide a thermal gap by increasing a distance between at least some of the heater region 108 (such as the vaporization portion 122 of the heating element 120) and the reservoir 55. In some implementations, the traces of the heating element 120 can include a necked region to increase the distance between the heater region 108 and the reservoir 55. As shown in FIGS. 5A and 5B, each tine 123A, 123B can have a proximal spacer portion 133 with a length that is greater than a length of its respective distal spacer portion 135. The greater length of the upper spacer portion 133 defines a thermal gap between the reservoir 55 and the heater region 108. The shorter length of the lower spacer portion 135 can reduce the bulkiness of the heating element 120 and/or can allow for additional components to be positioned within the atomizer chamber 110.

The heating element housing 112 of the atomizer chamber 110 can surround at least a portion of the heating element 120. The heating element housing 112 can include any of plastic, ceramic, metal, and/or other materials.

FIG. 8 illustrates a perspective cross-sectional view of a section of a cartridge in which at least a portion of the heating element 120 is incorporated consistent with implementations of the current subject matter. As shown in FIG. 8, the heating element housing 112 can support the heating element 120. For example, the heating element housing can include a plurality of lower and upper support protrusions and recesses, designed to accept and support the upper and lower heating element supports 134, 136 of heating element 120. For example, a lower protrusion 150A can be positioned within an upper recess 150B formed between adjacent upper protrusions 150C. Similarly, in some implementations, an upper protrusion 150C can be positioned within a lower recess 150D formed between adjacent lower protrusions 150A. The plurality of protrusions and recesses 150 can support at least the upper and lower heating element supports 134, 136 of the heating element 120. As shown in at least FIG. 8, the end portions of the upper and lower heating element supports 134, 136 are positioned between a corresponding upper recess and lower protrusion or lower recess and upper protrusion.

FIGS. 10A-12B illustrate another embodiment of the heating element 120 including a second plate portion 706 and a first plate portion 708 having a plurality of upwardly extending members 702 defining capillary channels 704 therebetween. The capillary channels 704 may include the same or similar features to the span 128 (e.g., capillary gap) described above.

Figure 10A:
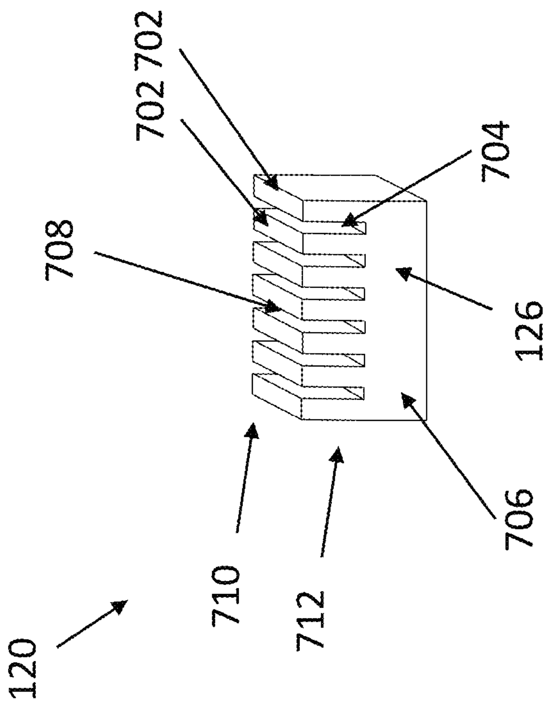
FIG. 10A illustrates a perspective view of a schematic of a heating element consistent with implementations of the current subject matter.
Figure 10B:
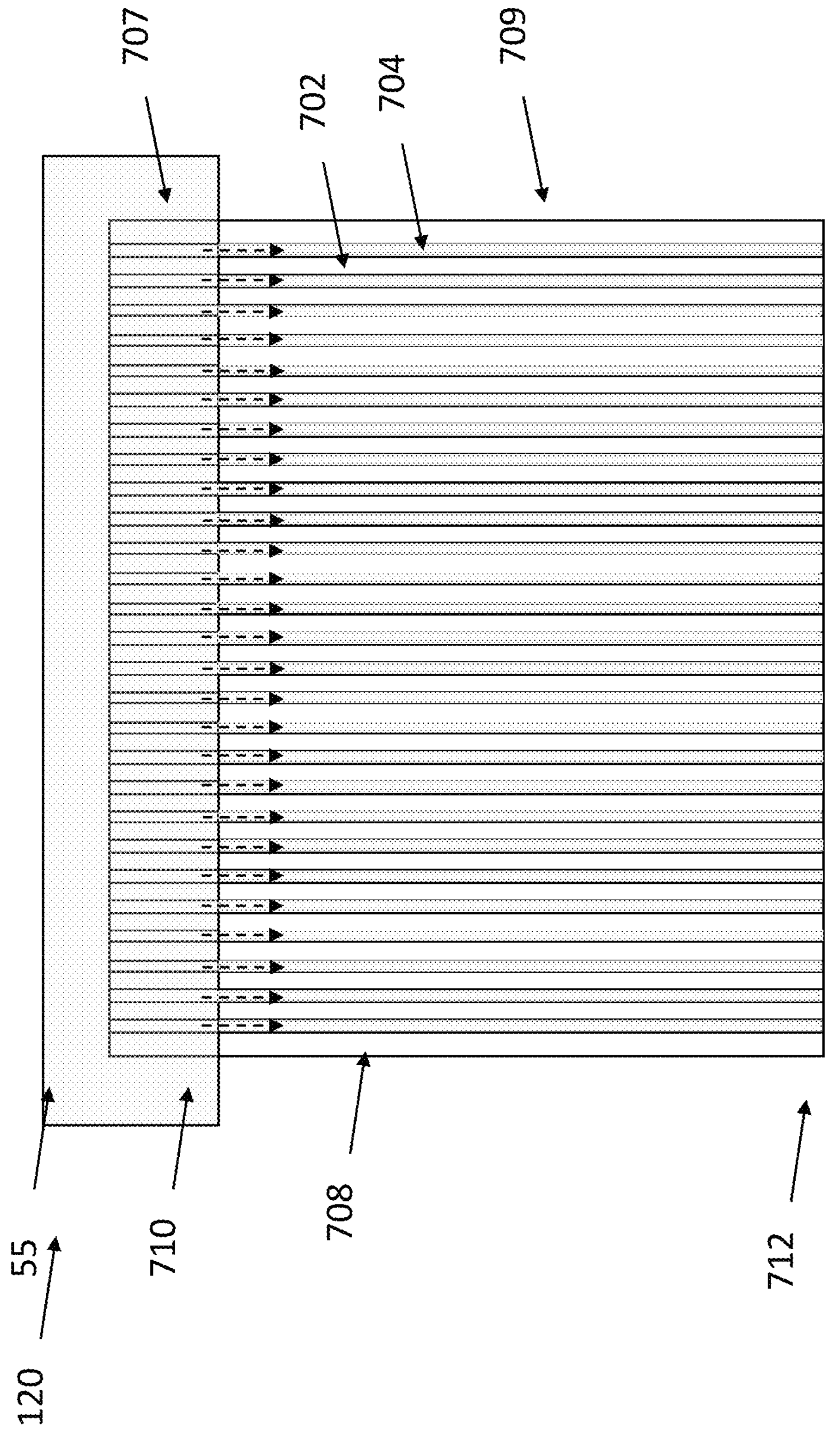
FIG. 10B illustrates a schematic of a heating element and a reservoir consistent with implementations of the current subject matter.
Figure 11B:
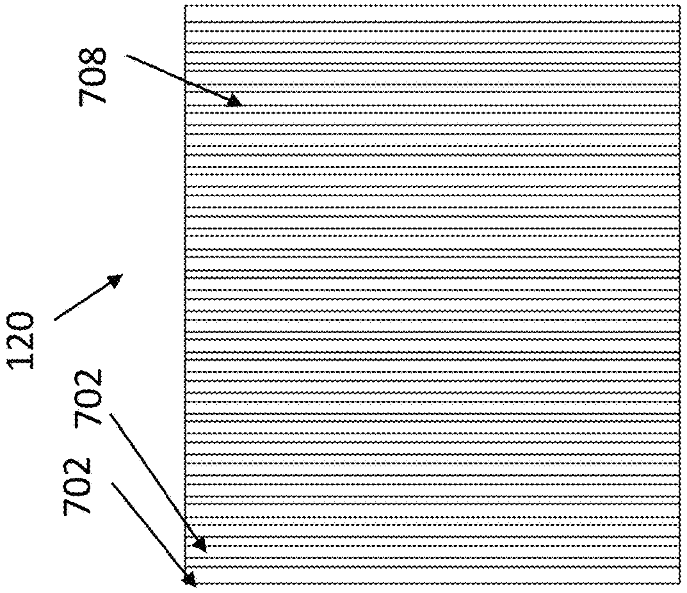
FIG. 11B illustrates a heating element consistent with implementations of the current subject matter.
Figure 11A:
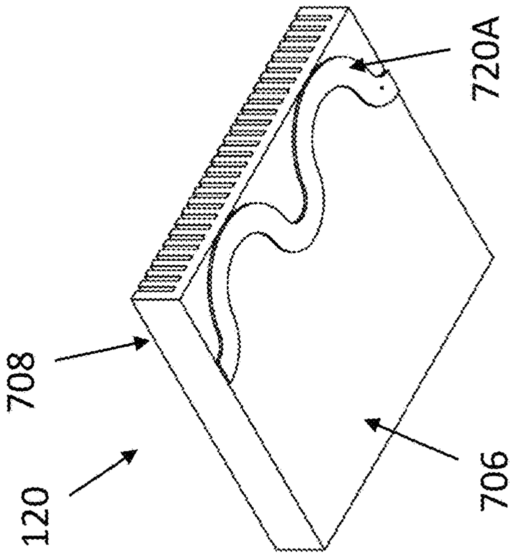
FIG. 11A illustrates a perspective view of a heating element consistent with implementations of the current subject matter.
Figure 11C:
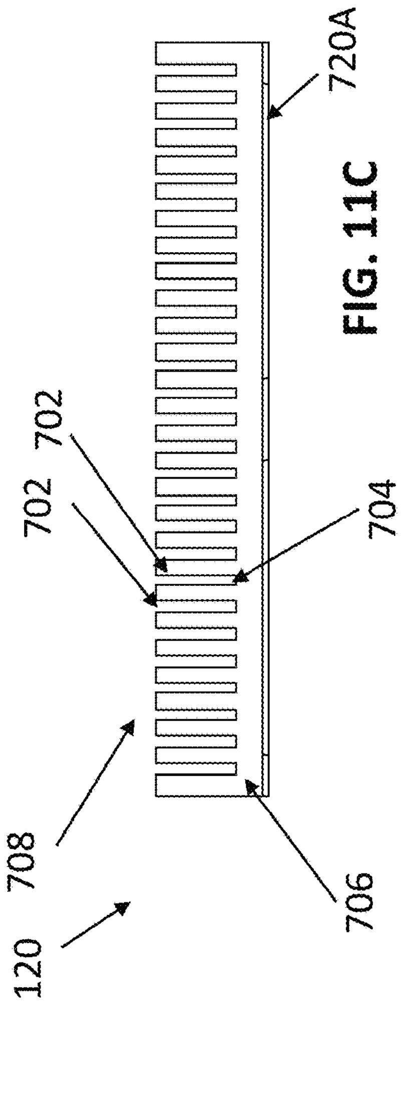
FIG. 11C illustrates a bottom view of a heating element consistent with implementations of the current subject matter.

As shown in FIG. 10B, the heating element 120 can include a proximal end portion 710 and a distal end portion 712. The proximal end portion 710 can be in fluid communication with the reservoir 55 of the vaporizer cartridge 52.

The second plate portion 706 can include a heater, such as a heater 720A, positioned on a lower end portion of the second plate portion 706 and/or along at least a portion of an outer surface of the second plate portion 706. In some implementations, the second plate portion 706 can be otherwise heated to define a heater region.

The first plate portion 708 and the second plate portion 706 can be integrally formed. The first plate portion 708 can include a plurality of upwardly extending members 702. The upwardly extending members 702 can be spaced apart to define the plurality of channels 704 that extend between adjacent upwardly extending members 702. The channels 704 can define a plurality of capillary gaps formed between adjacent upwardly extending members 702. The capillary gaps can allow fluid, such as the vaporizable material, to be held between and/or drawn into the space between adjacent upwardly extending members 702 in various orientations. The vaporizable material may be drawn from the reservoir 55 to a heater region of the heating element 120 via capillary action, for example, via the channels 704. Such configurations can allow for pressure within the cartridge to be controlled.

The upwardly extending members 702 can be parallel, forming channels 704 having approximately equal widths. In some configurations, the channels 704 can have varying widths, in the direction of fluid flow. As discussed above with respect to span 128 shown in FIGS. 2A-9, the channels 704 can be desirably narrow to maintain strong and/or sufficient capillary forces to draw and/or otherwise retain the fluid between upwardly extending members 702. For example, the size of the channels 704 may control the rate at which the fluid is replenished within the channels 704. In some implementations, the channels 704 can be desirably selected and/or sized to limit or prevent the vaporizable material from draining into or out of the channels 704 too quickly, and/or secure the vaporizable material within the channels 704. In some implementations, the size of the channels 704 can be desirably selected and/or sized to allow the channels 704 to hold a sufficient amount of vaporizable material such that the channels 704 does not need to be replenished during a puff, and/or can be easily replenished during and/or after a puff.

Figure 12B:
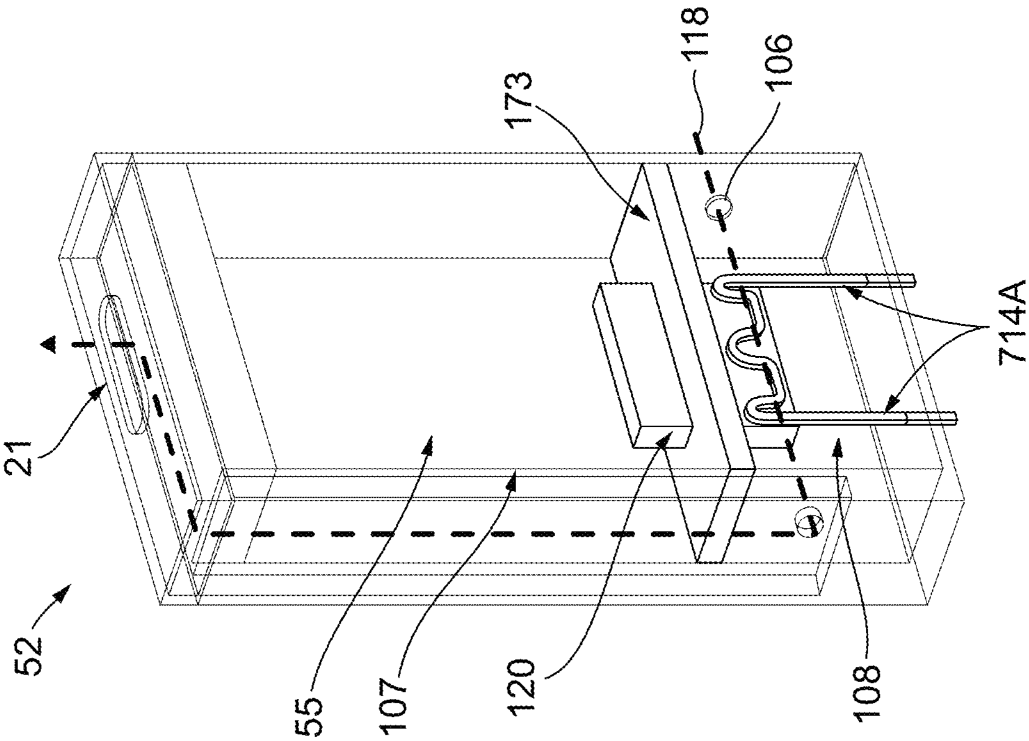
FIG. 12B illustrates a perspective view of a vaporizer cartridge in which a heating element is incorporated consistent with implementations of the current subject matter.
Figure 12A:
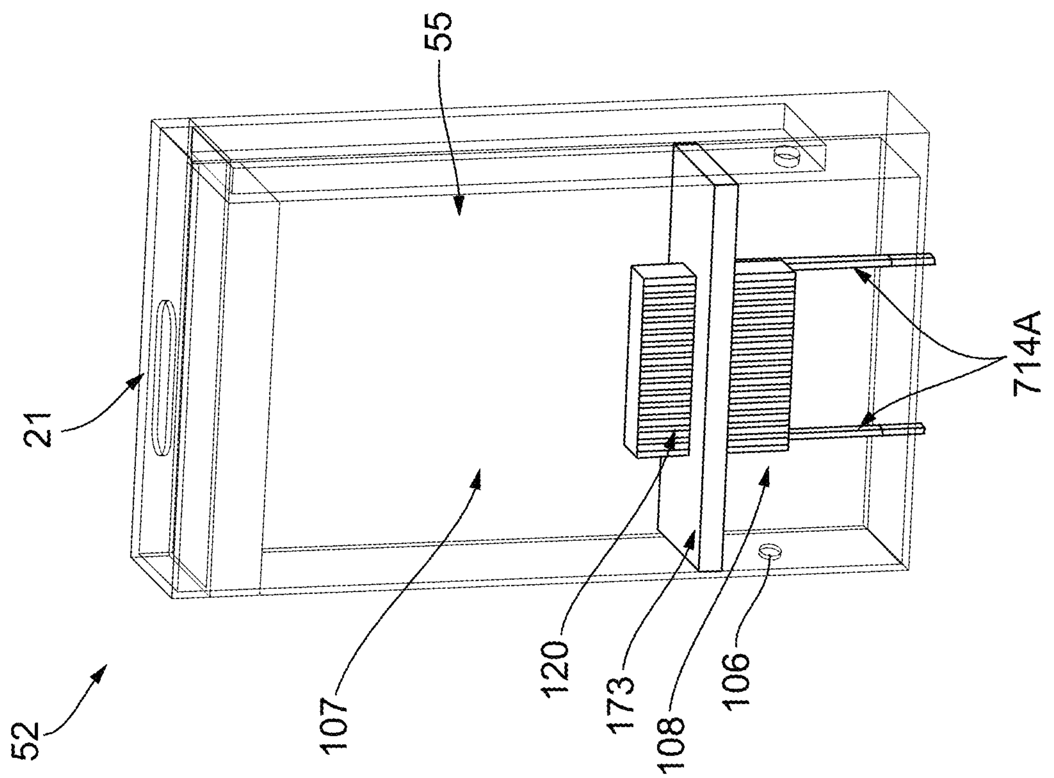
FIG. 12A illustrates a perspective view of a vaporizer cartridge in which a heating element is incorporated consistent with implementations of the current subject matter.

As shown in FIGS. 12A and 12B, the heating element 120 can be held in place by a gasket 173 or other sealing mechanism. The gasket 173 can be integrally and/or separately formed with the heating element 120. The gasket 173 can separate the heater region 709 from the fluid region 707. The gasket 173 can include various materials, such as silicone and/or plastic, among others. In some implementations, the gasket 173 has a thin thickness to allow for air return through the channels 704.

When a user puffs on the mouthpiece 21 of the vaporizer cartridge 52, air flows into the inlets 106, 116, and along the air path 118. In association with the user puff, the heating element 120 may be activated, e.g., by automatic detection of the puff via a pressure sensor, by detection of a pushing of a button by the user, by signals generated from a motion sensor, a flow sensor, a capacitive lip sensor, or other approach capable of detecting that a user is taking or about to be taking a puff or otherwise inhaling to cause air to enter the vaporizer device 100 and travel at last along the air path 118.

When the heating element 120 is activated, a temperature increase results due to current flowing through the heating element 120 to generate heat. The heater 120A and/or the heating element 120 can be supplied current through leads 714A. The leads 714A can extend to an exterior of the vaporizer cartridge 52. In some implementations, the heater 120A and/or the heating element 120 may be connected to the power supply directly such that the device may be leadless, or through other means. The heat is transferred to some amount of the vaporizable material through conductive, convective, and/or radiative heat transfer such that at least a portion of the vaporizable material vaporizes. The heat transfer can occur to vaporizable material in the reservoir and/or to vaporizable material drawn into one or more of the capillary channels 704 formed between the adjacent upwardly extending members 702. The heat transfer between the heating element 120 and the vaporizable material residing within capillary gaps can occur at the heater region. In some implementations, the vaporizable material can vaporize along one or more edges surrounding the channels 704 in the heater region of the heating element 120. The air passing into the vaporizer device 100 flows along the air path 118 through the atomizer chamber 110, stripping away the vaporized vaporizable material from the channels 704. The vaporized vaporizable material can be condensed due to cooling, pressure changes, etc., such that it exits the mouthpiece 21 as an aerosol for inhalation by a user. The heating element 120 can be made of various materials, including but not limited to, one or more of nichrome, stainless steel, or other resistive heater materials, plastic, and/or a ceramic material and/or other porous materials.

Figure 13A:
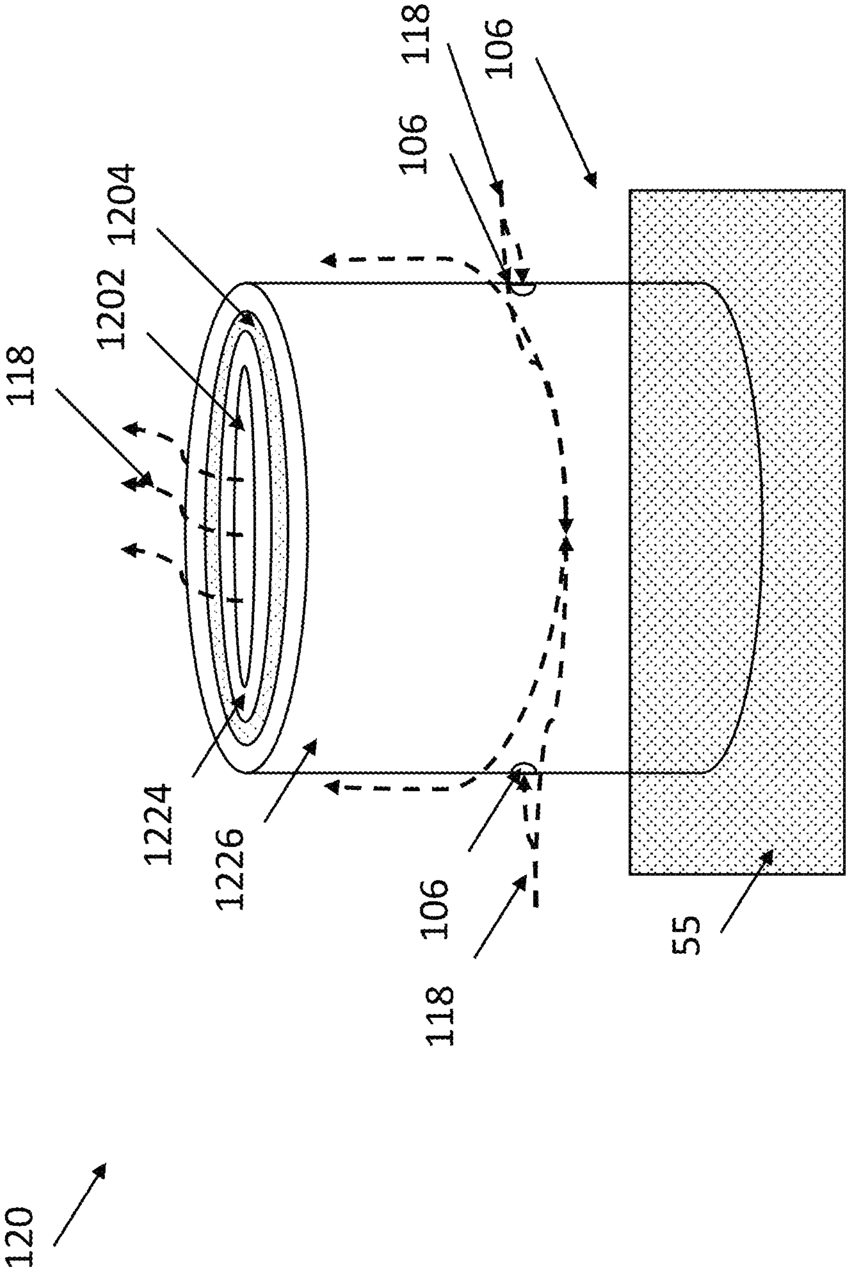
FIG. 13A illustrates a schematic of a heating element and a reservoir consistent with implementations of the current subject matter.
Figure 13B:
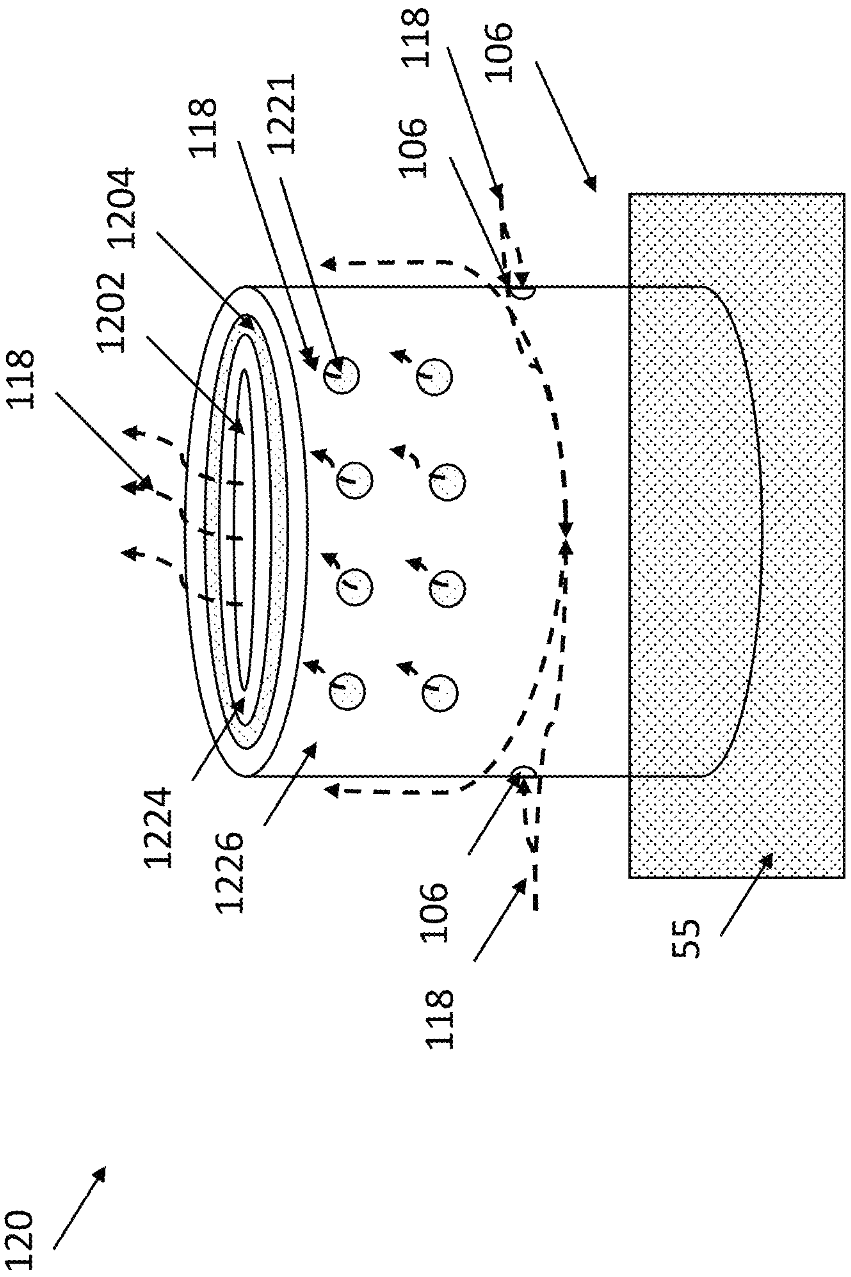
FIG. 13B illustrates a schematic of a heating element and a reservoir consistent with implementations of the current subject matter.
Figure 13C:
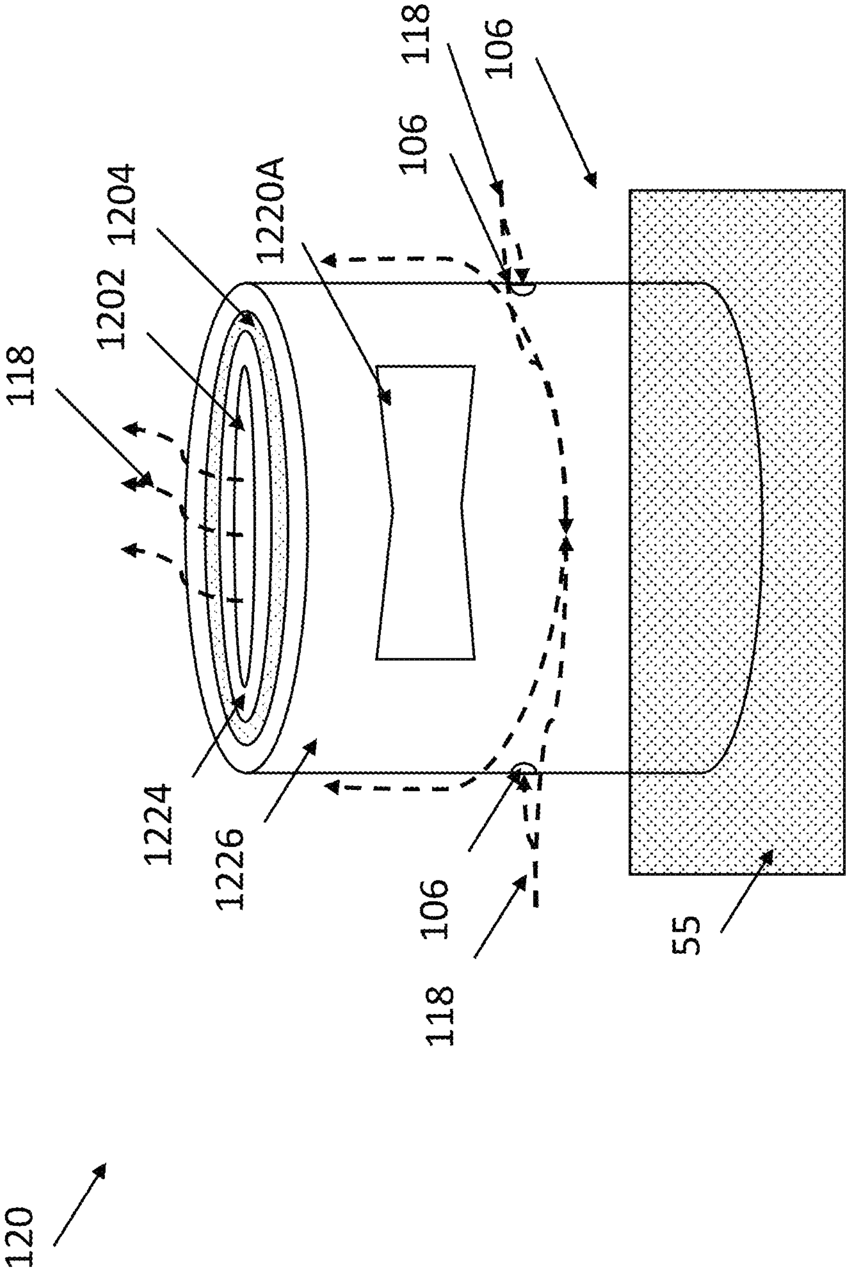
FIG. 13C illustrates a schematic of a heating element and a reservoir consistent with implementations of the current subject matter.

FIG. 13A illustrates another embodiment of the heating element 120 including an inner plate portion 1224 and an outer plate portion 1226 that may at least partially surround the inner plate portion 1224. The inner and/or outer plate portions 1224, 1226 can include a plurality of perforations 1221 (see, e.g., FIG. 13B) and/or resistive traces to heat the vaporizable material to cause the vaporizable material to evaporate, thereby generating an aerosol. In some implementations, the inner and/or outer plate portions 1224, 1226 can include a heater 1220A positioned on a surface, such as an exterior surface to heat the heating element 120 (see FIG. 13C).

The outer plate portion 1226 can surround the inner plate portion 1224. The inner and outer plate portions 1224, 1226 can include a variety of shapes, such as cylindrical (as shown in FIG. 13A), rectangular, squared, or other shapes. The outer plate portion 1226 can be positioned parallel to the inner plate portion 1224 and can be spaced apart from the inner plate portion 1224 by a span that defines the capillary gap 1204 (which is the same as or similar to the span 128 described herein). For example, in the implementation shown in FIG. 23, the outer plate portion 1226 and the inner plate portion 1224 can form concentric tubes or cylinders.

When a user puffs on the mouthpiece 21 of the vaporizer cartridge 52, air flows into one or more inlets 106, and along the air path 118. In association with the user puff, the heating element 120 may be activated, e.g., by automatic detection of the puff via a pressure sensor, by detection of a pushing of a button by the user, by signals generated from a motion sensor, a flow sensor, a capacitive lip sensor, or other approach capable of detecting that a user is taking or about to be taking a puff or otherwise inhaling to cause air to enter the vaporizer device 100 and travel at last along the air path 118.

When the heating element 120 is activated, a temperature increase results due to current flowing through the heating element 120 to generate heat. The heat is transferred to some amount of the vaporizable material through conductive, convective, and/or radiative heat transfer such that at least a portion of the vaporizable material vaporizes. The heat transfer can occur to vaporizable material in the reservoir 55 and/or to vaporizable material drawn into the capillary gap 1204 formed between the inner and outer plate portions 1224, 1226. The heat transfer between the heating element 120 and the vaporizable material residing within capillary gaps can occur at the heater region. In some implementations, the vaporizable material can vaporize along one or more perforations 1221 in the inner and/or outer plate portions 1224, 1226. The air passing into the vaporizer device 100 flows along the air path 118 through the atomizer chamber 110, stripping away the vaporized vaporizable material from the heating element 120. As shown in FIG. 13, the air path can extend around an exterior of the outer plate portion 1226 and/or through the inlet 106 and through a central channel 1202 defined by the inner plate portion 1224. The vaporized vaporizable material can be condensed due to cooling, pressure changes, etc., such that it exits the mouthpiece 21 as an aerosol for inhalation by a user. The heating element 120 can be made of various materials, including but not limited to, one or more of nichrome, stainless steel, or other resistive heater materials, plastic, and/or a ceramic material and/or other porous materials.

In some implementations, the heating element 120 can include a ceramic material and/or other porous materials, such as high-temperature resistant materials including, for example and not limitation, metals, glass, carbon, and/or high-temperature resistant plastic materials such as, for example and not limitation, polyphenylene sulfide (PPS), liquid crystal polymer (LCP), or polyether ether ketone (PEEK). The porous material may be characterized by having a plurality of voids or spaces, allowing for the absorption of liquid from the reservoir. As described above, the heating element 120 can be formed of one, two, or more plates. In some implementations, the plates can include printed heater traces to heat the vaporization portion 122 of the heating element 120. Such configurations can be desirable for better manufacturability and/or heat stability, among other advantages. In some implementations, at least one of the plates having printed heater traces can include at least one perforation to allow vapor to vent. In some implementations, the heating element 120 can include one or more plates having perforations and one or more plates having printed heater traces.

In certain implementations of the heating element 120 having printed heater traces, traces can be more easily positioned in parallel, for example, along a surface of the heater element 120. Such implementations of the heating element 120 can have a higher resistivity. Such implementations can more efficiently distribute power across the heater element 120 and/or reduce temperature differential across the heating element 120.

In certain implementations of the heating element 120 having printed heater traces, the heater traces and/or the structure of the heating element 120 may not be identical. Such implementations can allow ventilation slits to be supported at both ends of the heating element and/or provide greater stiffness to the heating element. This may simplify the surrounding mechanical complexity of the atomizer chamber 110 and/or the vaporizer cartridge 52.

In certain implementations of the heating element 120 having printed heater traces, the heating element 120 can have a low thermal conductivity, which can in some instances allow for more efficient power consumption.

In certain implementations of the heating element 120 having printed heater traces, the heating element 120 can have a greater area along a surface of the heating element that is unused. Such implementations can allow for the heating element 120 to have smaller dimensions. Such implementations can allow for additional electronic components to be positioned on the heating element 120.

An atomizer chamber consistent with implementations of the current subject matter has increased liquid-carrying capacity while also being thermally stable and having sufficient structural integrity for its use in vaporizer devices.

Moreover, the use of electrically conductive materials for the heating element (e.g., in the form of a trace pattern) allows for controlling a temperature of the heating element using a thermal coefficient of resistance (TCR) based correlation. Different electrically conductive materials (e.g., nickel) can be chosen and utilized to achieve a more stable TCR, resulting in precise temperature sensing/controlling.

An atomizer component consistent with implementations of the current subject matter may have an orientation other than that shown in the exemplary illustrations of FIGS. 1A-13C.

Although the examples described herein with respect to FIGS. 1A-13C are directed to a vaporizer that utilizes a removable cartridge, an atomizer chamber consistent with implementations of the current subject matter is not limited to such a device configuration. For example, an atomizer chamber may be incorporated as part of a vaporizer body 50 that includes a reservoir in which the atomizer and the heating element are included or in contact with.

Figure 14:
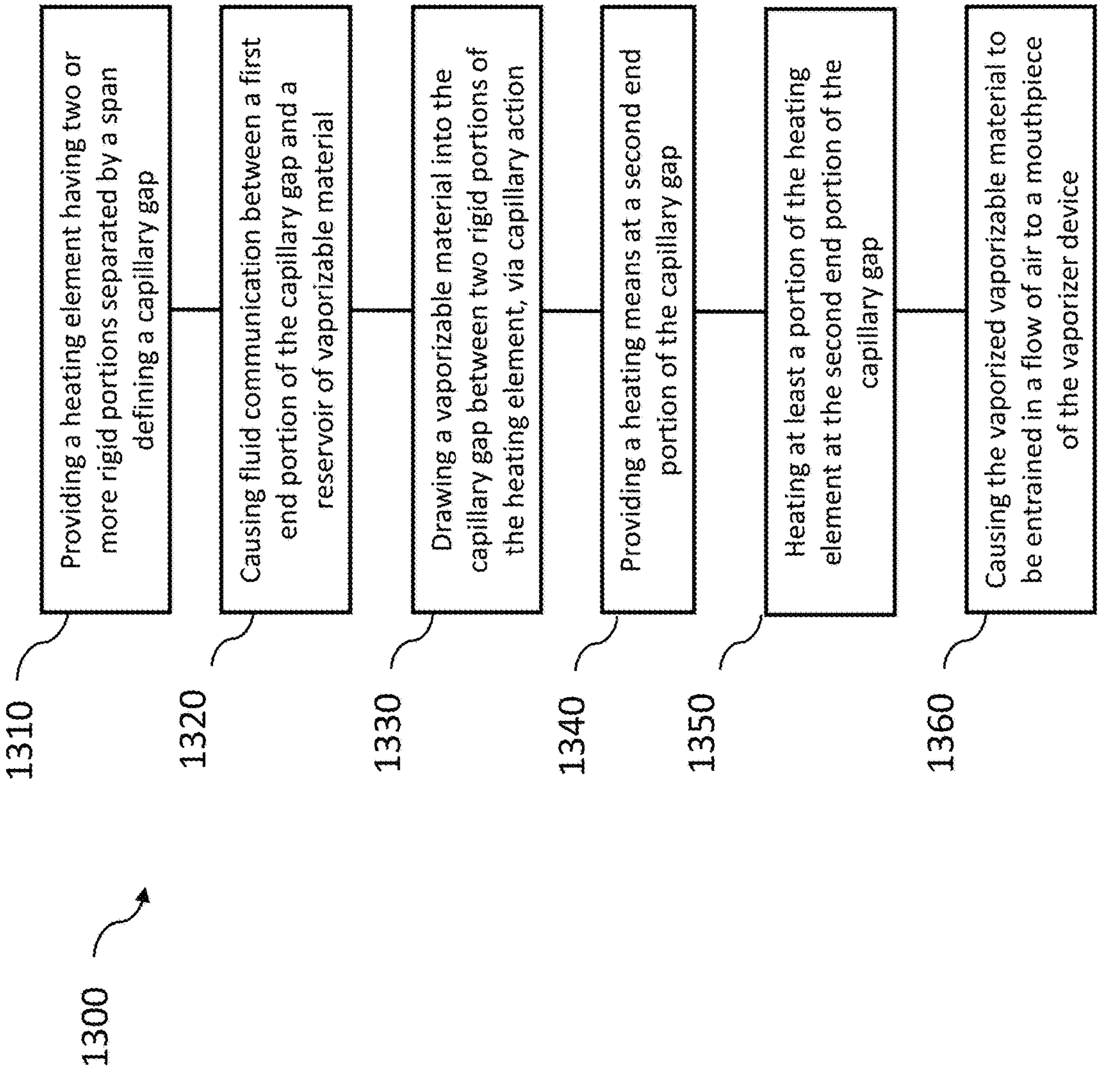
FIG. 14 shows a process flow chart illustrating features of a method of drawing a vaporizable material and causing vaporization of the vaporizable material in a vaporizer device consistent with implementations of the current subject matter.

With reference to FIG. 14, a process flow chart 1300 illustrates features of a method, which may optionally include some or all of the following. At block 1310, a heating element having two or more rigid portions separated by a span defining a capillary gap may be provided. At 13210, fluid communication between a first end portion of the capillary gap and a reservoir of vaporizable material may be caused. At 1330, the vaporizable material may be drawn into the capillary gap formed between the two rigid portions of the heating element via capillary action. At 1340, a heating means may be provided at a second end portion of the capillary gap. For example, at 1350, at least a portion of the heating element may be heated, such as at the second end portion of the capillary gap. The heating causes vaporization of the vaporizable material At block 1360, the vaporized vaporizable material is entrained in a flow of air to a mouthpiece of the vaporizer device in which the heating element is positioned.

Terminology

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "upper", "lower", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A cartridge for a vaporizer device, the cartridge comprising:
  a reservoir configured to hold a vaporizable material;
  a heating element configured to heat the vaporizable material, the heating element comprising:
    a capillary structure including a plurality of rigid portions,
    wherein pairs of the plurality of rigid portions are spaced apart from one another to define a capillary gap therebetween, the capillary gap configured to draw the vaporizable material from the reservoir to a heater region of the heating element to be heated, and an aerosol being generated by the heating of the vaporizable material drawn to the heater region of the heating element, the plurality of rigid portions comprising an upper rigid portion and a lower rigid portion, the lower rigid portion being integrally formed with the upper rigid portion and spaced apart from the upper rigid portion by a span that defines the capillary gap, the heating element forming a single portion that is folded to define the upper rigid portion and the lower rigid portion; and
    wherein the upper rigid portion of the plurality of rigid portions comprises an upper vaporization portion having a plurality of upper gaps and the lower rigid portion of the plurality of rigid portions comprises a lower vaporization portion having a plurality of lower gaps, and wherein the plurality of upper gaps are positioned laterally offset from the plurality of lower gaps; and
  an air inlet configured to direct a flow of air across the heater region such that when the heating element is activated, the vaporizable material drawn into the capillary gap at the heater region is vaporized into the flow of air through at least one of the plurality of upper gaps and the plurality of lower gaps.

2. The cartridge of claim 1, wherein the plurality of rigid portions of the capillary structure further comprises:
  an upper end portion configured to be in fluid communication with the reservoir; and
  a lower end portion comprising a heater.

3. The cartridge of claim 1, wherein the plurality of rigid portions of the capillary structure further comprises:
  an inner rigid portion defining a channel; and
  an outer rigid portion surrounding the inner rigid portion and spaced apart from the inner rigid portion by a span that defines the capillary gap.

4. The cartridge of claim 1, wherein the heating element is at least partially positioned within the reservoir.

5. The cartridge of claim 1, wherein the heating element comprises an electrically conductive layer.

6. The cartridge of claim 5, wherein the electrically conductive layer comprises a trace pattern.

7. The cartridge of claim 1, wherein the heating element comprises nichrome.

8. The cartridge of claim 1, further comprising an atomizer chamber housing that surrounds at least a portion of the heating element, the atomizer chamber housing comprising a cutout region.

9. The cartridge of claim 8, wherein the cutout region is configured to receive a porous material configured to absorb the vaporizable material.

10. The cartridge of claim 1, wherein the upper rigid portion is positioned parallel to the lower rigid portion.

11. The cartridge of claim 1, wherein the heating element comprises a plurality of perforations to allow the vaporizable material to evaporate therethrough.

12. A vaporizer device comprising:
  a vaporizer device body; and
  the cartridge of claim 1.

13. A vaporizer device comprising:
  a reservoir configured to hold a vaporizable material;
  a heating element configured to heat the vaporizable material, the heating element comprising:
    a capillary structure including a plurality of rigid portions,
    wherein pairs of the plurality of rigid portions are spaced apart from one another to define a capillary gap therebetween, the capillary gap configured to draw the vaporizable material from the reservoir to a heater region of the heating element to be heated, and an aerosol being generated by the heating of the vaporizable material drawn to the heater region of the heating element, the plurality of rigid portions comprising an upper rigid portion and a lower rigid portion, the lower rigid portion being integrally formed with the upper rigid portion and spaced apart from the upper rigid portion by a span that defines the capillary gap, the heating element forming a single portion that is folded to define the upper rigid portion and the lower rigid portion; and
    wherein the upper rigid portion of the plurality of rigid portions comprises an upper vaporization portion having a plurality of upper gaps and the lower rigid portion of the plurality of rigid portions comprises a lower vaporization portion having a plurality of lower gaps, and wherein the plurality of upper gaps are positioned laterally offset from the plurality of lower gaps; and
  an air inlet configured to direct a flow of air across the heater region such that when the heating element is activated, the vaporizable material drawn into the capillary gap at the heater region is vaporized into the flow of air through at least one of the plurality of upper gaps and the plurality of lower gaps.

14. The vaporizer device of claim 13, wherein the plurality of rigid portions of the capillary structure further comprises:
  an upper end portion configured to be in fluid communication with the reservoir; and
  a lower end portion comprising a heater.

* * * * *